(12) United States Patent
Dunie et al.

(10) Patent No.: US 7,765,199 B2
(45) Date of Patent: Jul. 27, 2010

(54) METHOD AND SYSTEM TO INDEX CAPTIONED OBJECTS IN PUBLISHED LITERATURE FOR INFORMATION DISCOVERY TASKS

(75) Inventors: Matthew Dunie, Great Falls, VA (US); Craig W. Emerson, Lothian, MD (US)

(73) Assignee: Proquest LLC, Ann Arbor, MI (US)

( * ) Notice: Subject to any disclaimer, the term of this patent is extended or adjusted under 35 U.S.C. 154(b) by 422 days.

(21) Appl. No.: 11/717,123

(22) Filed: Mar. 13, 2007

(65) Prior Publication Data

US 2007/0219970 A1 Sep. 20, 2007

Related U.S. Application Data

(60) Provisional application No. 60/783,459, filed on Mar. 17, 2006.

(51) Int. Cl.
*G06F 17/00* (2006.01)
(52) U.S. Cl. .................. 707/711; 707/736; 707/758; 707/791
(58) Field of Classification Search .......... 707/600–831
See application file for complete search history.

(56) References Cited

U.S. PATENT DOCUMENTS

| 5,950,196 A | 9/1999 | Pyreddy et al. | |
| 2001/0025284 A1* | 9/2001 | Seol et al. | 707/203 |

FOREIGN PATENT DOCUMENTS

| JP | 04-097248 A | 3/1992 |
| JP | 05-012350 A | 1/1993 |
| JP | 09-006777 A | 1/1997 |
| JP | 10-228473 A | 8/1998 |
| JP | 2000-194690 A | 7/2000 |
| JP | 2003-248690 A | 9/2003 |
| JP | 2005-519395 A | 6/2005 |
| JP | 2006-031660 A | 2/2006 |

OTHER PUBLICATIONS

European Search Report, issued in corresponding European Patent Application No. 07104374.9-1225, dated on Jul. 26, 2007.
Silva, et al. "Design of an end-to-end method to extract information for tables", International Journal of Document Analysis and Recognitions (IJDAR), Springer-Verlag, vol. 8, No. 2-3, Feb. 25, 2006, pp. 144-171.

(Continued)

*Primary Examiner*—Isaac M Woo
(74) *Attorney, Agent, or Firm*—Miles & Stockbridge P.C.; Mark A. Catan, Esq.; Michael A. Minter, Esq.

(57) ABSTRACT

The present invention relates to the identification, extraction, linking, storage and provisioning of data that constitute the captioned components of published or "print ready" literature for computerized information discovery activities including search, browse and data mining. These components, or objects, include the tabular presentation of data ("tables") and graphics such as "figures", "images" and "illustrations" typically used to supplement the textual narrative of the publication.

6 Claims, 31 Drawing Sheets

OTHER PUBLICATIONS

Hu, et al., "Evaluating the performance of table processing algorithms", International Journal on Document Analysis and Recognition Springer-Verlag. vol. 4 No. 3. Mar. 2002, pp. 140-153, Germany.

Pinto, et al., "Table Extraction Using Conditional Random Fields", Proc. of the 26th Annual International ACM SIGIR Conference on Research and Development in Information Retrieval, Jul. 28, 2003-Aug. 1, 2003, pp. 235-242.

Zanibbi, et al. "A survey of table recognition Models, observations, transformations, and inferences", International Journal on Document Analysis and Recognition, vol. 7, No. 1 Sep. 1, 2004, pp. 1-16, Germany.

Mao, et al., "Document Structure Analysis Algorithms: A Literature Survey", Proceedings of the SPIE, vol. 5010, Jan. 2003, pp. 197-207, Bellingham, Virginia.

Australian Application No. 2007201124—Examination Report dated Aug. 20, 2008.

European Application No. 07104374.9—Examination Report dated Nov. 2, 2009.

Japanese Application No. 2007-069764—Office Action dated Nov. 4, 2009 (With English Translation).

* cited by examiner

Figure 2. The effect of dietary rapeseed oil (a) and dietary vitamin E and copper (b) on $Feb^{2+}$ induced lipid oxidation of pig liver.

| Table 1. Vitamin E concentrations in fish eggs and muscle tissue | | | | | |
|---|---|---|---|---|---|
| | αToc* | MDT* | %MDT⁺ | γToc* | δToc* |
| Egg | | | | | |
|   Chum salmon (n = 4) | 144 | 35.8 | 19.9 | 1.4 | 2.1 |
|   Masu salmon (n = 2) | 352 | 35.1 | 9.1 | 0.0 | 2.8 |
|   Culture masu salmon (n = 3) | 280 | 0.9 | 0.3 | 4.5 | 1.0 |
|   Sockeye salmon (n = 1) | 227 | 37.7 | 14.2 | 4.0 | 0.0 |
|   Walleye pollack (n = 1) | 40.6 | 6.2 | 13.2 | 0.1 | 0.0 |
|   Pacific herring (n = 1) | 2.5 | 0.2 | 7.4 | 0.0 | 0.0 |
|   Pacific cod (n = 1) | 41.0 | 3.1 | 7.0 | 0.1 | 0.0 |
|   Flyingfish (n = 1) | 3.3 | 0.2 | 5.0 | 0.1 | 0.0 |
| Muscle | | | | | |
|   Chum salmon (n = 4) | 6.7 | 1.7 | 20.2 | 0.1 | 0.1 |
|   Masu Salmon (n = 4) | 39.3 | 5.2 | 12.3 | 0.0 | 0.1 |
|   Cultured masu salmon (n = 4) | 60.4 | 0.3 | 0.4 | 1.5 | 0.6 |
|   Coral trout (n = 1) | 5.02 | 0.13 | 2.5 | 0.00 | 0.08 |
|   Nangrove jack (n = 1 | 3.45 | 0.04 | 1.0 | 0.00 | 0.00 |
|   Red-throat sweetip (n = 1) | 3.01 | 0.01 | 0.5 | 0.03 | 0.00 |
|   Blue tailed cod (n = 1) | 4.30 | 0.01 | 0.3 | 0.00 | 0.00 |
| Gonad | | | | | |
|   Chum salmon (n = 2) | 91.7 | 20.6 | 18.3 | 0.0 | 0.5 |
|   Masu salmon (n = 3) | 207 | 16.5 | 7.5 | 0.0 | 0.3 |
|   Cultured masu salmon (n = 2) | 508 | 0.5 | 0.1 | 1.7 | 0.2 |
| Spleen | | | | | |
|   Chum salmon (n = 3) | 26.7 | 3.3 | 11.0 | 0.0 | 0.2 |
|   Masu salmon (n = 2) | 349 | 31.1 | 8.0 | 0.0 | 0.7 |
|   Cultured masu salmon (n = 3) | 240 | 0.5 | 0.2 | 2.5 | 0.0 |
| Liver | | | | | |
|   Chum salmon (n = 1) | 402 | 33.3 | 7.6 | 0.0 | 0.0 |
|   Masu salmon (n = 1) | 555 | 38.3 | 6.4 | 0.0 | 0.7 |
|   Cultured masu salmon (n = 1) | 1040 | 1.2 | 0.1 | 13.5 | 0.8 |
| Phytoplankton | 0.64 | 0.17 | 21.0 | 0.00 | 0.00 |
| Zooplankton | 4.60 | 0.54 | 10.5 | 0.00 | 0.00 |
| Commercial feed for masu salmon | 16.2* | Trace$ | <0.1 | 14.9$ | 2.6* |

*Namol/g of wet tissue.
⁺%MDT = 100 × MDT/(MDT + a-Toc).
$Namol/g of dry feed.

FIG. 2B

Results and Discussion

Vitamin E in Fish Tissues. The vitamin E concentration and the MDT composition [ %MDT = 100 x MDT / (MDT + $\alpha$-Toc)] in eggs and tissues from a selection of fish are given in Table 1. The eggs of chum salmon, sockeye salmon, and walleye pollack showed a higher % MDT composition (19.9, 14.2, and 13.2%, respectively) than eggs of warmer water fish. Similarly, native chum and masu salmon (sakura - masu) had greater %MDT values in their muscle (20.2 and 12.3%, respectively) than did tropical fish ($\leq$ 2.5%) such as coral trout, mangrove jack, red-throat sweetlip, and blue - tailed cod. This comparison provides that greater concentrations of MDT generally occur in species of cold-water fish.

PHAS | Noverber 6, 2001 | vol. 96 | no. 23 | 13145

FIG. 2C

```
//comma separated list
objectTypeList=Figure
objectCaptionCapture=on
objectSizeCapture=On
InTextReferenceCapture=On
InTextReferenceCapturePageInfo=On
objectOCRRecognition=off
```

FIG. 5

```
<?xml version="1.0" encoding="UTF-8" ?>
- <object id="Fig2" type="Figure">
  <article
  src="PLoS_V_3_I_12_DOI_30426_15457885_Document.xml" />
- <caption> <![CDATA[ Distribution of American Kennel Club
  Registrations by Breed in 2004  Nearly a million dogs are
  registered with the American Kennel Club each year. Though the total
  includes dogs from 154 breeds, most registrations represent a limited
  number of very popular breeds. The most popular breed, Labrador
  retriever, accounts for 15.3% of yearly registrations. This is greater
  than the 118 least popular breeds combined. Each breed on the chart
  above is represented by a colored block. The height on the y-axis
  indicates the number of dogs registered in 2004. The blocks are divided
  into six stacks indicating the percent of overall registrations acquired by
  that breed, as listed on the x-axis. Above each column is the percent of
  total registrations for all breeds in that category. Registration statistics
  can be found at http://www.akc.org/reg/dogreg_stats.cfm. 
  ]]>
  </caption>
  <image src="PLoS_V_1_I_5_DOI_10058-38449_Fig_15537404.jpg"
  size="45804" filetype="JPEG" />
- <text_reference page="1"> <![CDATA[ The top ten most popular
  breeds account for more than half of all registrations, while more than
  100 of the more uncommon breeds account for less than 15% of
  the total (Figure 2). ]]>
  </text_reference>
- <text_reference page="1"> <![CDATA[ Figure 2. Distribution of
  American Kennel Club Registrations by Breed in 2004 Nearly a million
  dogs are registered with the American Kennel Club each year. ]]>
  </text_reference>
  </object>
```

Labels: 702, 704, 700, 706

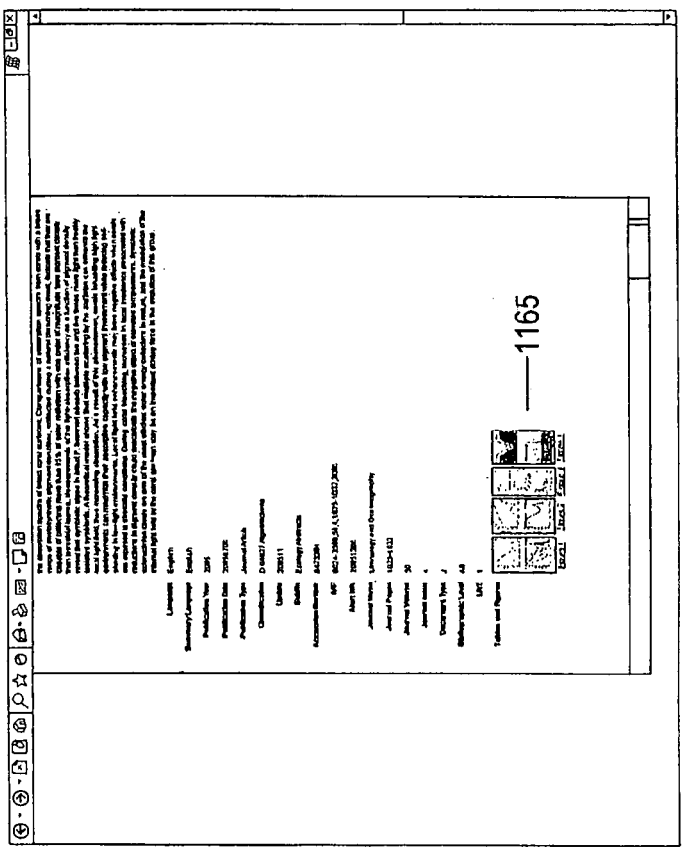
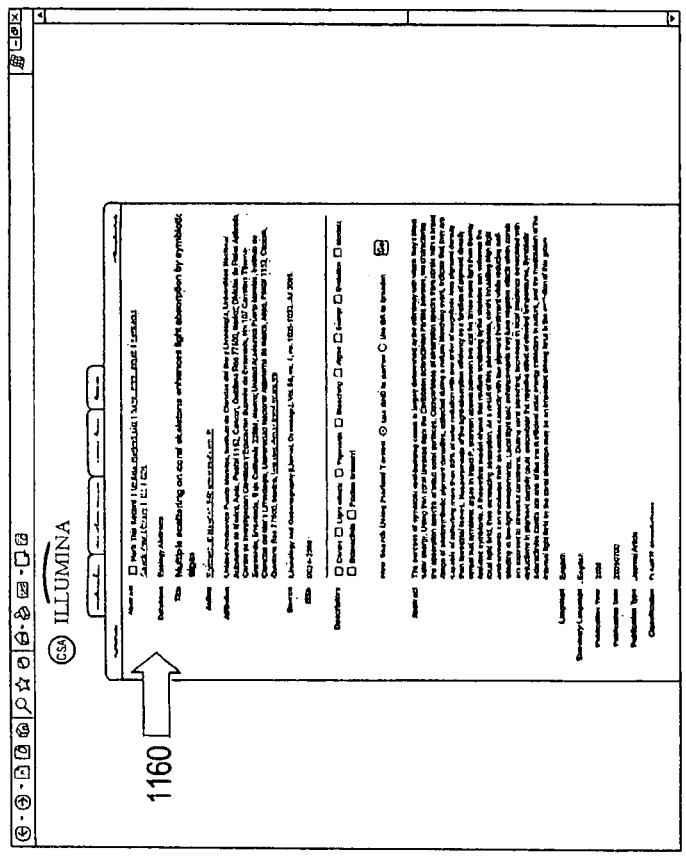
FIG. 11E

Table 1

Station information from the two sites where northern lampfish (*Stenobrachius leucopsarus*) and northern smoothtongue (*Leuroglossus schmidti*) were present. The number of each species captured is given. Listed values of water temperature (°C), salinity (ppt). density (Kg/m$^3$). turbidity (FTU), and chlorophyll concentration (µg/L) are those which correspond to the fishing depth.

| | Site 1 | Tow 1 | Tow 2 | Tow 3 | Tow 4 |
|---|---|---|---|---|---|
| | | | Site 2 | | |
| Northern lampfish (no.) | 2 | 57 | 0 | 0 | 1 |
| Northern smoothtonge (no.) | 0 | 81 | 0 | 0 | 152 |
| Region | Icy Straic | Muir Inlet | Milr Inlet | Muir Inlet | Muir Inlet |
| Date | 6/12/99 | 6/15/99 | 6/15/99 | 6/15/99 | 6/15/99 |
| Time of day | 1540 | 1730 | 1830 | 1850 | 1930 |
| Time prior to senset (hour: min) | 6:23 | 4:36 | 3:36 | 3:16 | 2"36 |
| Latitude (North) | 58° 16.28' | 59° 04.27' | 59° 04.13' | 59° 03.95' | 59° 04.44' |
| Longitude (West) | 135° 37.38' | 136° 19.93' | 136° 19.07' | 136° 19.07' | 136° 19.59' |
| Bottom depth (m) | 124 | 187 | 187 | 187 | 187 |
| Fishing depth (m) | 90 | 10-15 | 10 | 20 | 100 |
| Temperature (°C) | 5.77 | 5.18 | 5.69 | 4.83 | 4.28 |
| Salinity (ppt) | 32.07 | 30.37 | 29.70 | 30.73 | 31.15 |
| Density. sigma-theta (kg/L) | 25.29 | 23.99 | 23.40 | 24.31 | 24.69 |
| Turbidity (FTU) | 8.08 | 14.97 | 15.14 | 14.67 | 11.69 |
| Chlorophyll concentration (µg/L) | 1.61 | 1.38 | 2.15 | 1.30 | 0.86 |

FIG. 13D

METHOD AND SYSTEM TO INDEX CAPTIONED OBJECTS IN PUBLISHED LITERATURE FOR INFORMATION DISCOVERY TASKS

RELATED APPLICATION

This application claims the benefit of U.S. Provisional Application No. 60/783,459 filed Mar. 17, 2006 entitled "Method and System to Index Captioned Objects in Published Literature for Information Discovery Tasks," the disclosure of which also is entirely incorporated herein by reference.

BACKGROUND

1. Field

The present invention relates generally to automatic information capture techniques and, more particularly to the secondary publishing (or, abstracting and indexing) industry.

2. Background

Captioned components such as figures and tables represent the distilled essence of research communicated in academic articles. Although the marginalia surrounding these displays of data is useful, researchers are eager to view the actual data collected, observed, or modeled to determine the article's relevance to their work. Raw data sets are usually unavailable, but the processed data displayed in figures and tables are as, or even more, valuable.

The primary objective of a literature search is to find articles containing information most relevant to researchers' interests. Neither traditional article-level indexing provided by standard Abstracting & Indexing (A & I) services, nor full-text indexing whereby all text within a document is indexed, can restrict a result set to only those publications which contain data of interest.

For one reason, many key variables are excluded from traditional A&I searches because, although discretely important, they are generally not reflected in the more general nature of the author's abstract or the article title, traditional grist for the A&I indexing mill. Also, variables can be hidden from full-text searches because critical text within figures and tables is actually part of an image file which is not indexed (and made searchable) in full-text search systems. Web harvesters (e.g. Google) do not distil text from images. Furthermore, variables are 'diluted' in full-text indexes because many matches are peripheral; i.e., the variable of interest appears as an indirect reference (e.g. in a literature reference cited within an article). As a result, the identified article may not actually contain a figure or table including that particular variable.

A secondary objective of a literature search has been more intractable—and arguably more valuable. Any variable appearing in a figure or table within an article can be searched and linked to other studies examining the same variable. Traditional A&I services are adequate tools to help answer research questions, but there remains a need for indexing other information such as, for example, tables and figures that goes further. By revealing data links in studies across disciplines, new avenues of research can be illuminated.

SUMMARY

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of a system for indexing and locating captioned objects is illustrated by way of example, and not by way of limitation, in the accompanying drawings, wherein:

FIGS. 2A and 2B illustrate another exemplary document having a captioned object along with a detailed view of that captioned object;

FIG. 2C illustrates an exemplary section of a document referencing a captioned object;

FIG. 5 depicts an exemplary extraction rule;

FIG. 7 illustrates an exemplary extracted object as XML;

FIG. 8 illustrates an exemplary editorial screen for extracting information about captioned objects in accordance with the principles of the present invention;

FIGS. 11A-11E depict exemplary interface screen shots of a search application involving captioned objects;

FIGS. 13A-13I depict exemplary captioned objects that may be used in different embodiments of the present invention to provide advantages over merely textual abstracting and indexing.

DETAILED DESCRIPTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention. In particular, exemplary embodiments are provided below that specifically describe camera-ready or printed documents. Such specifics are for illustrative purposes only and one of ordinary skill will recognize that documents of various, different formats may be used without departing from the scope of the present invention.

Captioned Objects in Published Research

Figure 1A:
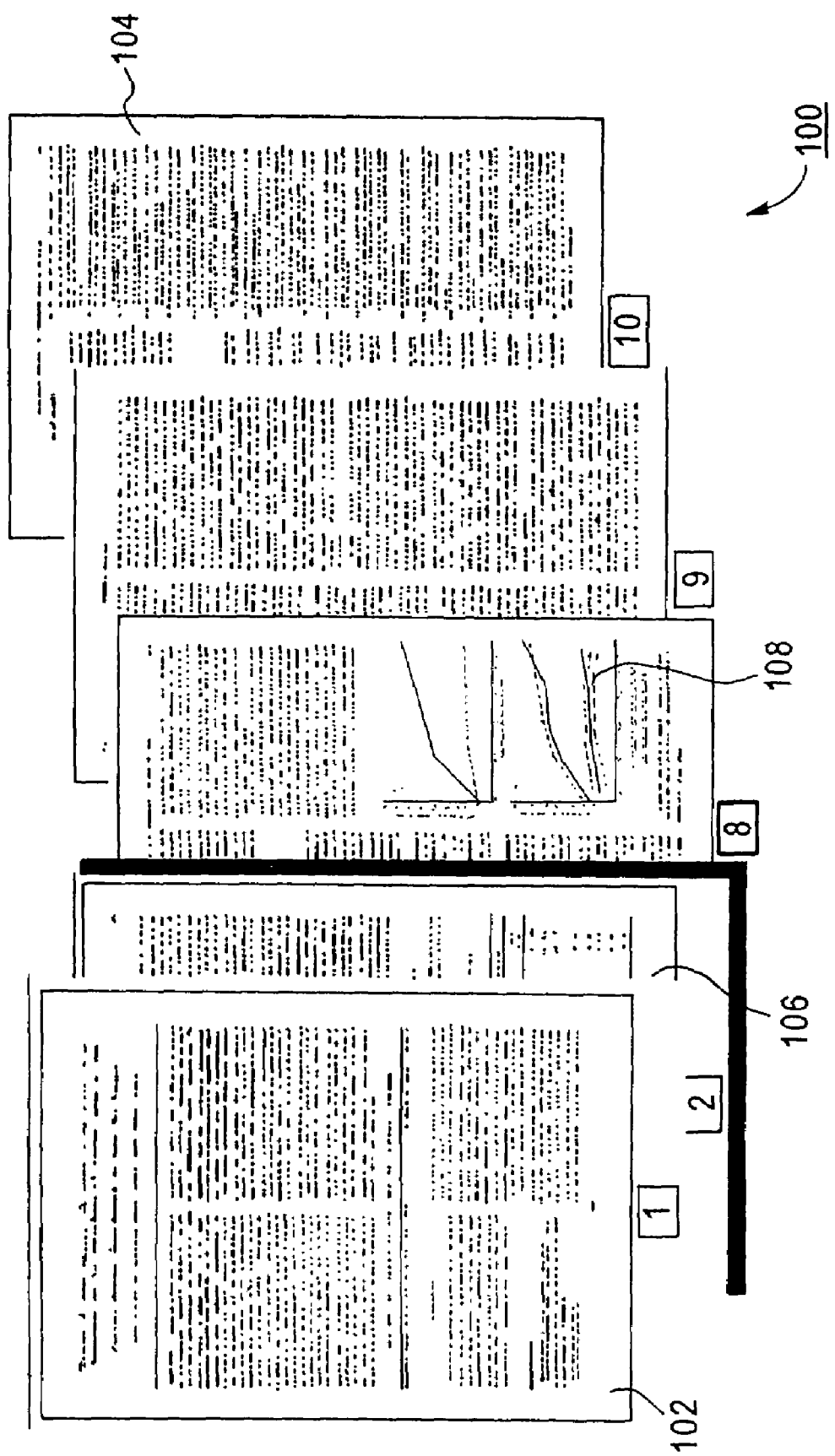
FIGS. 1A and 1B illustrate an exemplary document having a captioned object along with a detailed view of the captioned object.

FIG. 1A is an illustration of a print or camera-ready document from which captioned objects may be extracted by embodiments of the present invention. As described herein, a print or camera-ready document is a document which is already in a printed publication, or shortly going to be made available for dissemination via a publication. For the purposes of exposition, and without loss of the wider contexts in which this invention is intended to serve, these documents are assumed to contain scholarly content meant for dissemination to a wider audience of researchers, and will be referred to as "research articles". The print-ready articles may be associated with a traditional paper-based publication, or be available via an "e-journal". Regardless of the channel in which the articles have been, or will be, disseminated, these research articles contain several distinct components that are recognized in the art. In the abstracting, indexing and search context, these components are commonly referred to in the art as "citation" information (for example, "title", "author(s)", "publication", "volume", "issue", "page numbers") that can uniquely identify the article and its associated publication, an "abstract" (a short section of text that summarizes the document), the "full-text" (the main body of the document) and "cited references" (references to other articles used by the authors(s) in the article). An abstract may be provided by the author(s), or an abstract may be written by a third-party such as an abstracting and indexing service, or other secondary publisher.

Within the full-text, the author's exposition may require the provision of information that cannot be concisely conveyed using a textual narrative. This is especially true in the presentation of research studies, where a textual exposition/explanation of numeric data and statistical results may be cumbersome. In these circumstances, authors may present the desired information in the form of distinct components or objects placed within the full-text and make references to these objects in the textual narrative. In the art, these components are commonly referred to as "tables" and "figures". A table is a row and column presentation of data that may be presented without there being a trend or pattern of relationship between sets of data values. A figure is a visual presentation of results, including graphs, charts, diagrams, photos, drawings, schematics, maps, etc. According to the conventions of written communication, content such as tables and figures are distinct entities in of themselves and typically contain a caption that consists of a referential label (e.g., "Figure 1", "Figure 4", etc.) and a description (e.g., "Vitamin E concentrations in fish eggs and muscle tissue" or "The effect of dietary rapeseed oil (a) and dietary vitamin E and copper (b) on $Fe^{2+}$-induced lipid oxidation of pig liver."). Of particular interest to the present description are these captioned objects or components found in print-ready articles.

According to FIG. 1A, the full-text of an article 100 commences on Page 1 102 (after the title, author and abstract sections) and continues to page 10 104 (which includes the commencement of the citations). The full-text consists of the textual narrative, arranged in two columns and two captioned objects. Of the visible pages depicted, Pages 2 and 8 contain objects 106, 108 pertaining to one or more embodiments of the present invention.

Figure 1B:
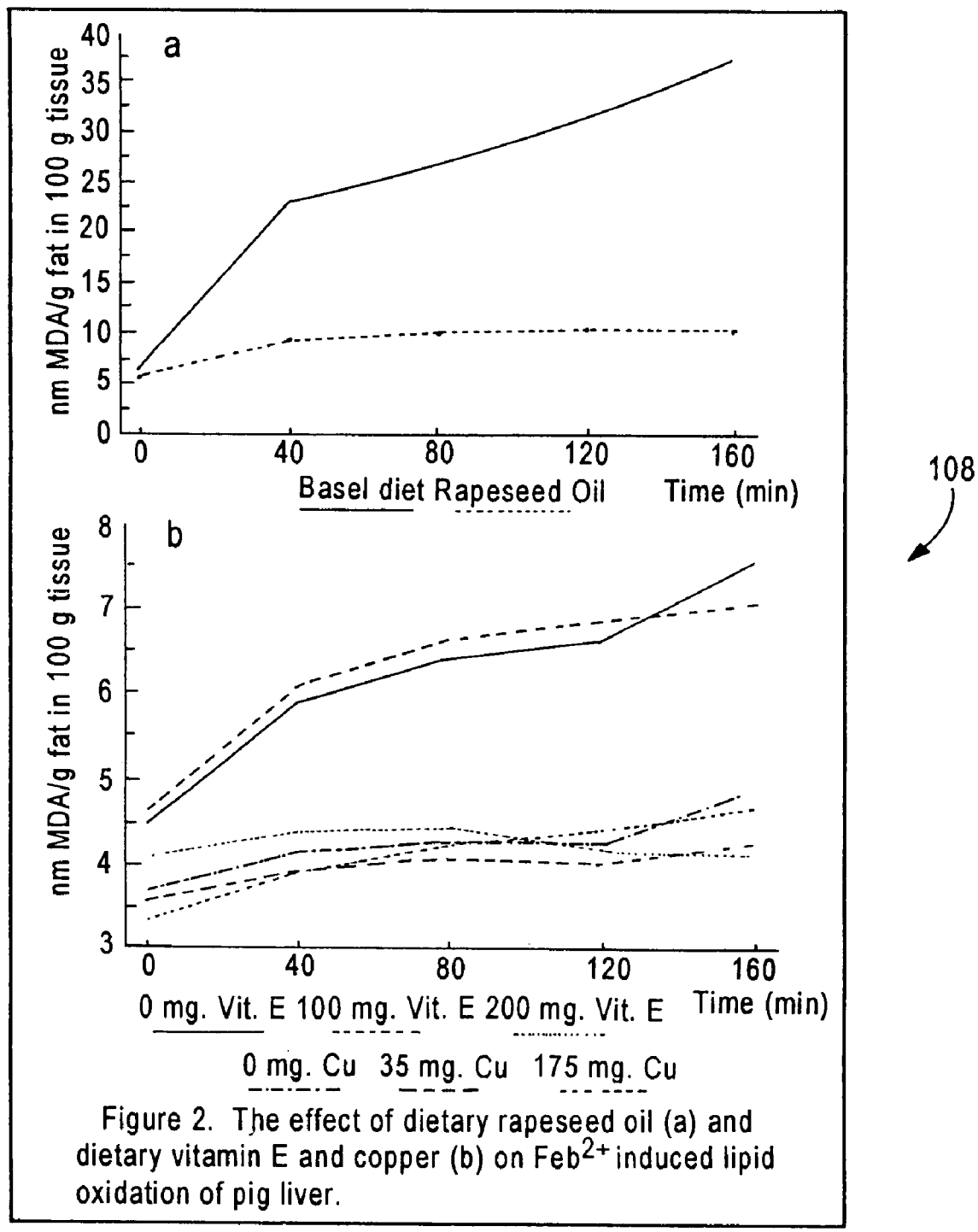

FIG. 1B depicts an exploded view of one of the objects 108 on page 8. According to the illustration, this object denoted by the authors as "Figure 2" comprises a caption and two line graphs. The line graphs in the object also contain information of interest to researchers in the axes labels such as the measurement units of the variables depicted. In addition to the labels, there are also various legends associated with the different axes. This valuable information which is the focus of the present invention is not captured by indexing or search systems in the prior art.

Figure 2A:
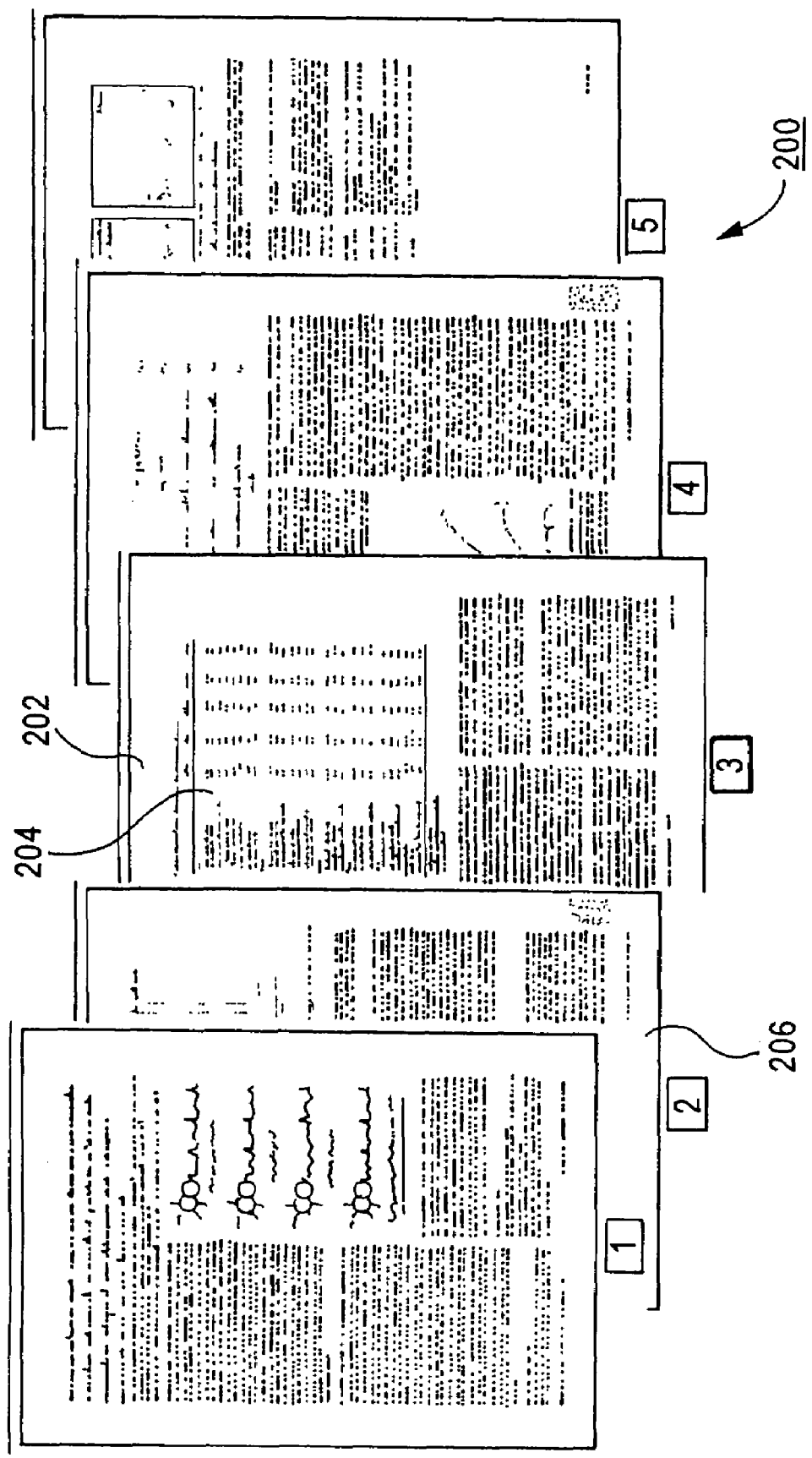

FIG. 2A illustrates another exemplary full-text article 200 along with FIG. 2B that depicts an exploded view of one of the objects 204 of the article that occurs on Page 3 202. According to the illustration, the object to be identified and extracted is what is described in the art as a 'table' which in this specific instance summarizes Vitamin E concentration in fish eggs and muscle tissue data arranged in rows with data elements. FIG. 2C depicts an exploded view 208 of a section of Page 2 206 where the first reference 210 to this object 204 is made by the authors in the full-text of the article specifically the paragraph beginning with "Vitamin E in Fish Tissues." Comparing the contents of this paragraph of referential text with that of the captioned object (table), it will be apparent to one skilled in the art that the information content of the table object is far richer than the summary provided by the author within the full-text. For example, specific tissues are detailed in the object (e.g., gonad vs. muscle vs. spleen, etc.) but not in the summary. Moreover, vitamin E concentrations of live and commercial fish feed are displayed in the object, but are absent from the summary.

Hardware Overview

Figure 3:
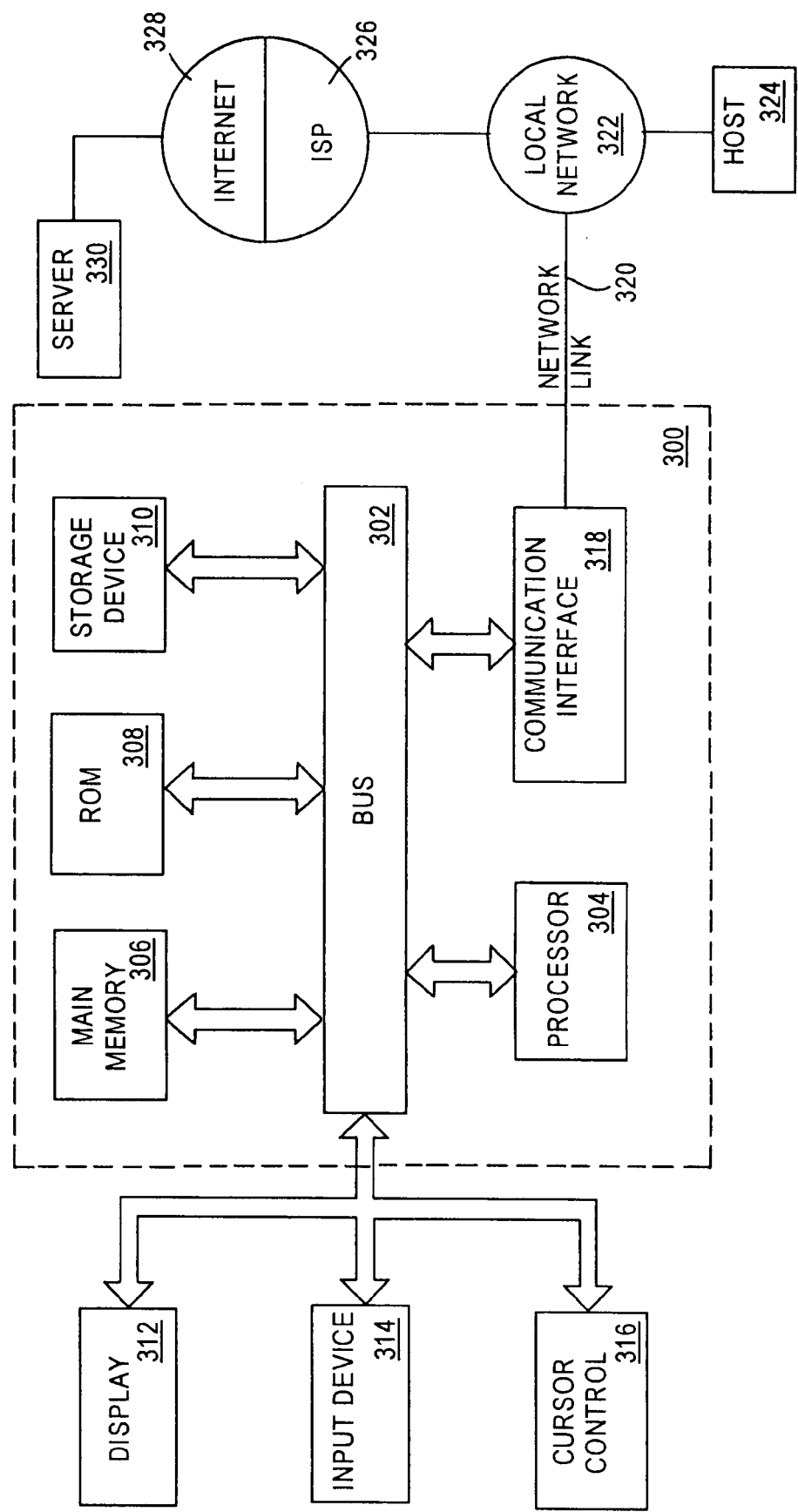
FIG. 3 depicts an exemplary computer system on which an embodiment of the present invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 may also be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 operates in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. The received code may be executed by processor 304 as it is received, and/or stored in storage device 310, or other non-volatile storage for later execution. In this manner, computer system 300 may obtain application code in the form of a carrier wave.

Thus, two or more computers may be used to provide the full functionality of the present invention using networked or connected computer systems. For example, the input and output devices used by a computer user to communicate instructions and view information may be located on another computer system. When the two computer systems are connected via the Internet, a computer user on the other computer system may output in a local web-browser and can communicate instructions to the computer application on computer system 300 using a local input device such as the user's keyboard. The user's instructions are transmitted through the network, received by communications interface and transferred to processor internally via the bus.

Thus, embodiments of the present invention may be implemented as one or more modules, routines, or applications that are executed by the computer systems of FIG. 300. One of ordinary skill will recognize that the software, regardless of it specific structure, may be stored on a variety of different media and when executed, causes the computer platform to operate as programmed.

Extracting, Linking, Indexing and Storing Captioned Objects

Figure 4:
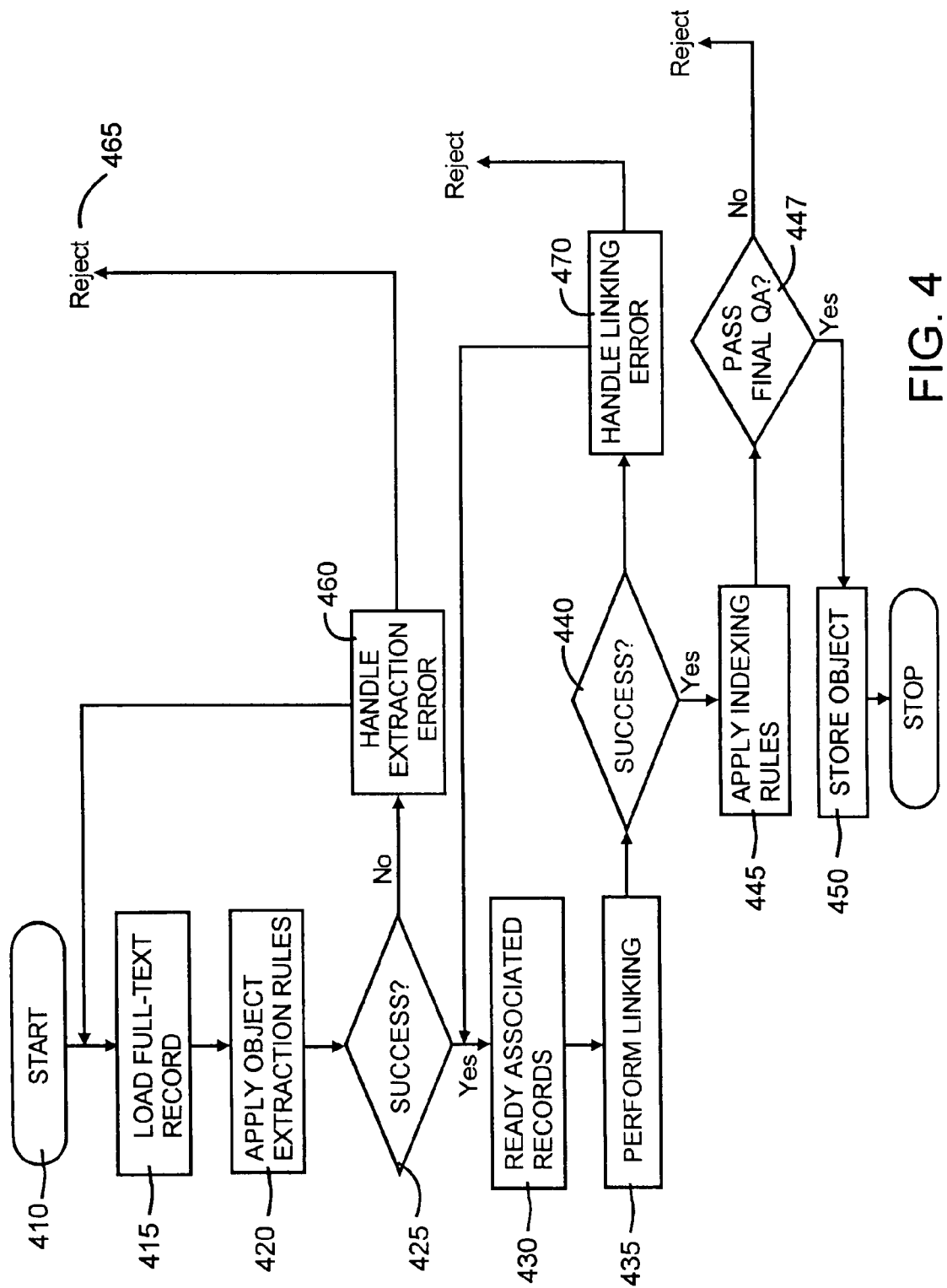
FIG. 4 depicts a flowchart of an exemplary algorithm of indexing captioned objects according to the principles of the present invention.

FIG. 4 is a flow chart illustrating the steps performed in extracting, linking, indexing and storing an object record for information discovery tasks according to an embodiment of the present invention, starting with step S410. At step S415, a print-ready article is loaded and readied for extraction. This step may include the retrieval of a batch of full-text articles from a publisher and splitting into individual articles or full-text components. Alternatively, this step may include using a 'crawler' to fetch components of a full-text article and storing the components locally. This technique may be applied to full-text articles that are available in mark-up language such as HTML that supports embedded resource links.

At step S420, extraction rules are applied to the full-text record. The extraction rules specify the type of captioned components to be identified and extracted, as well as the attributes and optionally attribute values that need to be extracted. According to a preferred embodiment, the extraction rules are specified for all captioned objects in the full-text. Generally speaking however, the objects to be extracted and their attributes are dictated by externally defined business requirements such as the intended information discovery use to which the extracted objects are to service, or even the intended audience. For example, the construction of a "map image" database may require only maps and their attributes be extracted from the full-text record. Likewise, the extraction rules may be specific to a particular publisher, journal, or file format (e.g., PDF vs. HTML vs. XML), or to a combination of these factors. The extraction rules may also specify attributes associated with the full-text of the article to be captured. According to a preferred embodiment, one such full-text attribute is the "Reference Text" such as 210, which is the fragment of the full-text that contains the reference to the to-be-extracted object. In another embodiment, the sequence of objects as they occur within the full-text is collected.

The extraction rules may also specify how the identified objects are to be labeled or tagged for future reference within the system. Assignment of "object ids" is advantageous, since the object id is typically the key which is used to store and retrieve the object record from the database repository.

Step S425 is a decision point where the success of the extraction is evaluated. Generally speaking, this step is a quality control point that prevents problems in extraction cascading 'downstream'. For example, an error condition may be flagged if the full-text makes reference to 'Table 6' and the extraction routine does not identify this object. A failure condition ('No') leads to extraction error handling Step S460. At Step S460, the cause of the failure is identified. Fixable failures such as those stemming from data format changes (e.g., a change in the XML schema) are reprocessed through Step S415, whereas corrupt or mal-formed records follow the Reject step 465. The rejection step may include communicating the identified rejected record and the reason for rejection back to the primary provider and submission of a request for a resubmission of the record.

The success condition at Step S425 may be based on deterministic rules or may be according to probabilistic success thresholds for the extracted objects and the list of attributes specified for extraction. The error condition described previously is an example of a deterministic rule. An example of a probabilistic success threshold relates to object extraction from an image file of the full-text. In this instance, locating the span of the object within the image file may be performed with a degree of certainty that does not fall within acceptable success thresholds.

Step S430 is a collation step where a number of different records, often from disparate sources, have to be readied prior to linking. According to one embodiment of the present invention, these records that need to be ready and accessible may include the 'Abstract' record and the source (or publication/publisher information) record.

Step S435 links the extracted object records to the corresponding abstract and source records. At the completion of this step, each extracted object record may be associated with an abstract record, the original full-text record and the source record from which the object was extracted. The source record may contain information about the article's access rights and the time when access may be granted to the public. At this linking step, these source-based attributes are associated with, or transferred to, the object record. The source attributes may include access rights which may differ by publisher. In other words, extracted objects from a publisher may have the same access rights as the full-text records, whereas access rights for objects from another publisher may have differing access rights than the full-text records from that publisher.

Step S440 is a quality control decision point, similar to S425, where the outcome of the linking step S435 is evaluated. The error handling step S470 determines the cause of the linking failure and may result in a reprocessing of the linking step, or an outright rejection of the object records.

Indexing step S445 follows a successful linking operation. In general, this step constitutes the editorial functions comprising the steps of: validation of extraction and linking steps, assignment of search/browse attribute values, assignment of subject specific descriptors, and authority control tasks such as spelling and name normalization. Step S447 is the final decision point, where the fully created object record, its attributes and assigned attributes are verified to be suitable for addition to the objects repository. Records that do not meet the passing conditions are rejected and may be attached to appropriate error resolution processes after which the record may be re-inserted at the appropriate process point described previously.

At Step S450, the fully constructed object record is stored in an objects data repository from where it may be packaged or repurposed for specific information discovery tasks including retrospective searching, alerting systems and browsing. The nature of the associations created within the object record, amongst objects records and between the objects, abstracts and full-text are discussed in detail below. In general, objects may be associated with each other according to the existence of a specific attribute (e.g., "Figure") or specific attribute value (Image type="Map") that is identified by extraction step S420 or assigned at indexing step S445. Specified attributes may be multiply occurring. For example, the attribute INDEX TERM may contain the two values "Sediment Slurries" and "Salinity". Furthermore, objects may be bi-directionally linked to the corresponding abstract record and full-text record. The bi-directional linkages facilitate retrieval modalities using both the full-text/abstract as the "base" and the indexed object themselves. In other words, a search and retrieval system may be designed to allow users to search for full-texts and/or abstracts and then communicate the object records associated with each retrieved full-text or abstract record. Alternatively, the search system may allow a user to search or browse a repository of objects and then find or view the associated abstract or full-text records.

While the foregoing discussion specifies a method of indexing a set of objects from a single full-text article, it must be appreciated that in a production operation, an objects extraction system must be designed to address issues of scale and be readily deployed to leverage existing A&I work-flows and data flows that are not "objects" focused, but rather full-text and abstracts focused.

Objects Content Processing System

Figure 6:
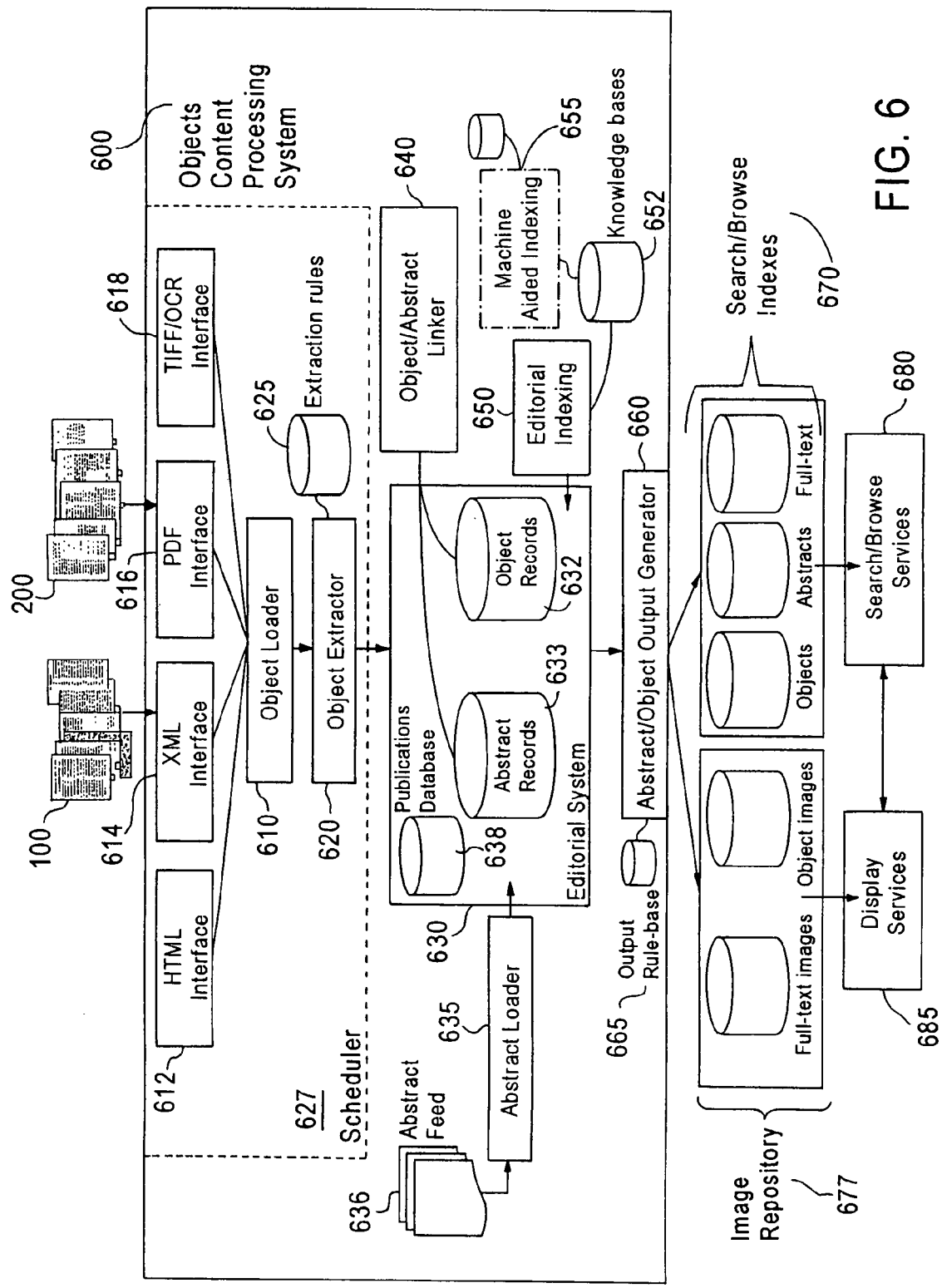
FIG. 6 depicts an exemplary system for extracting, indexing, searching and retrieving captioned objects in accordance with the principles of the present invention.

FIG. 6 is a block diagram of a scalable content processing system 600 that may be implemented on computer system 300 for objects extraction, linking, indexing and storage to support an objects-enhanced search/browse service 680 that, in conjunction with a user-interface, facilitates the matching of user queries against a stored index, displays search results and retrieves documents or document components for display to the user. For the purposes of exposition, and without loss of the full inventive nature of the specified method, this section will make references to full-text article 100 and full-text article 200 which may be articles from which objects may be extracted using the method described in FIG. 4.

Object Loader 610 is the input sub-system of objects content processing system 600 and is designed to retrieve or accept disparate full-text sources or 'feeds' and create a standardized output for Object Extractor 620. The Object Loader may in turn comprise one or more interfaces 612, 614, 616, 618 where each interface handles a specific type of full-text feed.

According to a preferred embodiment, a software interface is created based on the electronic media format or "content type" that print-ready documents are received in. According to the illustration depicted, HTML interface 612 accepts full-text feeds from full-text content repositories that are stored in HTML format. XML interface 614 processes print-ready records which are available in XML format, PDF interface 616 for print-ready records available in PDF (Portable Document Format) and so on. According to the illustration depicted, print-ready article 100 is supplied to the content processing system as an XML document while print-ready article 200 is supplied in PDF format.

In another embodiment, interfaces may be designed by the primary publisher or in another embodiment by publisher/media type combinations. This componentized approach allows the addition of new interfaces to support new media formats without requiring major modifications to other components of the content processing system 600. For example, the addition of print-ready documents supplied in a proprietary typesetting media format merely requires the creation of a new interface that may be attached to Object Loader 610.

Each content type interface may contain one or more software packages that are required to perform the extraction of objects from that specific content type. For the HTML interface an HTML parser may be employed. Similarly, for XML documents an XML parser and a style-sheet processor may be readied and used. PDF documents may require a PDF reader that extracts text and identifies the location of objects in the file. For scanned or bit-mapped documents (e.g., TIFF files) an OCR (Optical Character Recognition) package may be used to recognize and extract both text and images.

Object extractor module 620 processes a print-ready article according to the specific extraction rules 625 specified for the media-type and/or content source.

FIG. 5 is an illustration of an extraction rules configuration that may be applied to a specific document (or, set of documents). This illustration relates to extraction from PDF source documents. The depicted configuration is evaluated by extraction step S420 (see flowchart of FIG. 4) prior to the actual processing of the document. Stepping through the configuration, the first extraction rule specifies that only objects that are 'Figures' are to be extracted. In other words, if a table is encountered in the extraction process, it will be ignored. The configuration next specifies that the caption text for the specified objects (in this case, figure objects) is to be identified and extracted, as well as the size of the object. The extraction rules further specify that in-text references and their page numbers are to be captured. The final rule specifies that the captured object need not be passed on for OCR recognition because extraction of other information from the object is to be performed manually, or due to other business specifications.

Object Loader 620 and Object Extractor 620 sub-systems may be controlled by a Scheduler supervisory system 627 that performs scheduled invocations of these sub-systems according to pre-configured business and/or operational rules. Periodicity of publisher updates is one such business rule. For example, Publisher A may make print-ready articles available on a monthly basis, whereas Publisher B may provide this content on a bimonthly basis. Alternatively, an electronic journal may provide newly published articles on a daily basis. In similar fashion, on the operational side, Scheduler sub-system 627 may be configured to remove, compress or archive previously processed print-ready feeds.

FIG. 7 is an illustration of the output of Object Extractor 620 for a single object within a print-ready article that may be processed by the objects content processing system. According to one embodiment, the format of the output may be specified in extraction rules repository 625. According to the illustration depicted, this output format configuration parameter has been set to XML and includes a number of predetermined attributes for which values will be extracted. According to another embodiment, this output may be in plain ASCII format. In another embodiment, file-based output may be deactivated altogether in favor of a computationally efficient in-memory data-structure or software object. Additionally, the output rules may specify additional transformations to the extracted data based on requirements of display services 685. For example, uniform size thumbnail images of extracted images may be generated for display to the user. Similarly, extracted tables from documents in HTML format may be converted to images (e.g., JPEG or GIF) for uniformity in display size based on the limitation of output screen area size in the user interface.

The illustrated XML 700 encapsulates the specified attributes and attribute values for a specific content source. These information components include an in-article object reference ("Fig2") 702, the type of object extracted ("Figure") 704, the source 706 from which the object was extracted ("PLoS_V_3_I_12_DOI_30426_15457885_Document.xml"), the caption of the object extracted, the source file reference of the object, its size and file-type and the references to this object within the textual narrative (in-text reference), including the physical page location where the object is referred to in the textual narrative. According, to the illustration depicted, there are two such in-text references that occur on page 1 of the print-ready article.

Editorial System 630 supports the objects indexing activities step S445. The editorial system may be connected to an Abstract Loader sub-system 635 with which traditional abstract records 636 may be loaded into the abstracts repository 633. In addition, the editorial system may contain a publications database repository 638 which serves as a centralized or authoritative source of publication and publisher information. Editorial Indexing sub-system 650 provides editorial work-flow functionality by way of a user-interface, utility tools and software for editors to interact with the contents of the data repositories and perform editorial value-add tasks. These tasks include the assignment of domain-specific descriptors, synonyms, normalization of spellings, standardization of record attributes such as author names, citation information, etc., for which a knowledge base repository 652 may be used. In addition, machine-aided indexing software (MAI) 655 processes may be applied to facilitate, supplement or replace the human effort involved in the indexing process. When MAI is used in a supplemental role, the software processes input records and using configured rule-bases selects a set of suitable descriptor or index terms for approval by human editors. In a fully automated configuration, the MAI software assigns index terms without the human review step.

The editorial system and the repositories described minimize data duplication of abstract records. For example, when the contents of an abstract are appropriate for two disciplines (e.g., "Biophysics" and "Geological Sciences"), and presumably to be made available for search/browse according to these subject categories, a single abstract record may contain assigned descriptors from both subject areas. This preferred approach is contrasted to one where the abstract record is duplicated, one for every subject area for which descriptor terms needs to be assigned. The advantage of the data minimization approach is to be appreciated in the context of indexing objects where within a single article, multiple objects are available for extraction and indexing, and where each extracted object may be indexed for multiple subject areas. Clearly, the duplication approach would have detrimental implications for scaling any objects indexing operation.

Editorial System 630 addresses another operational reality, viz., the asynchronous availability of abstract records and object records (extracted from the print-ready article). Operational factors apart, this situation is the result of established publisher practices where abstracts are typically made available before the full-text and/or print ready articles. When newly extracted objects are received into Objects Records repository 632, Object/Abstract Linker 640 programmatically verifies the availability of the associated abstract record in abstracts repository 633. Attributes from the Publications Database 638 may also be associated or linked via a database key with the objects and abstract records. Furthermore, the linker assigns unique identifiers to the objects to facilitate search and browse activities that are supplied to end-users by search services 680.

According to a preferred embodiment of the present invention, the Object/Abstract Linker 640 processes objects in batch mode and signals editorial indexing process 650 when a new set of objects is ready for indexing. According to another embodiment the linker may be attached first to MAI software 655 which in turn signals the availability of objects for indexing. In yet another embodiment when the publisher feeds are completely synchronized, the object/abstract linker may be configured to run in real-time.

Object Validation and Descriptor Assignment Sub-System

Figure 8:
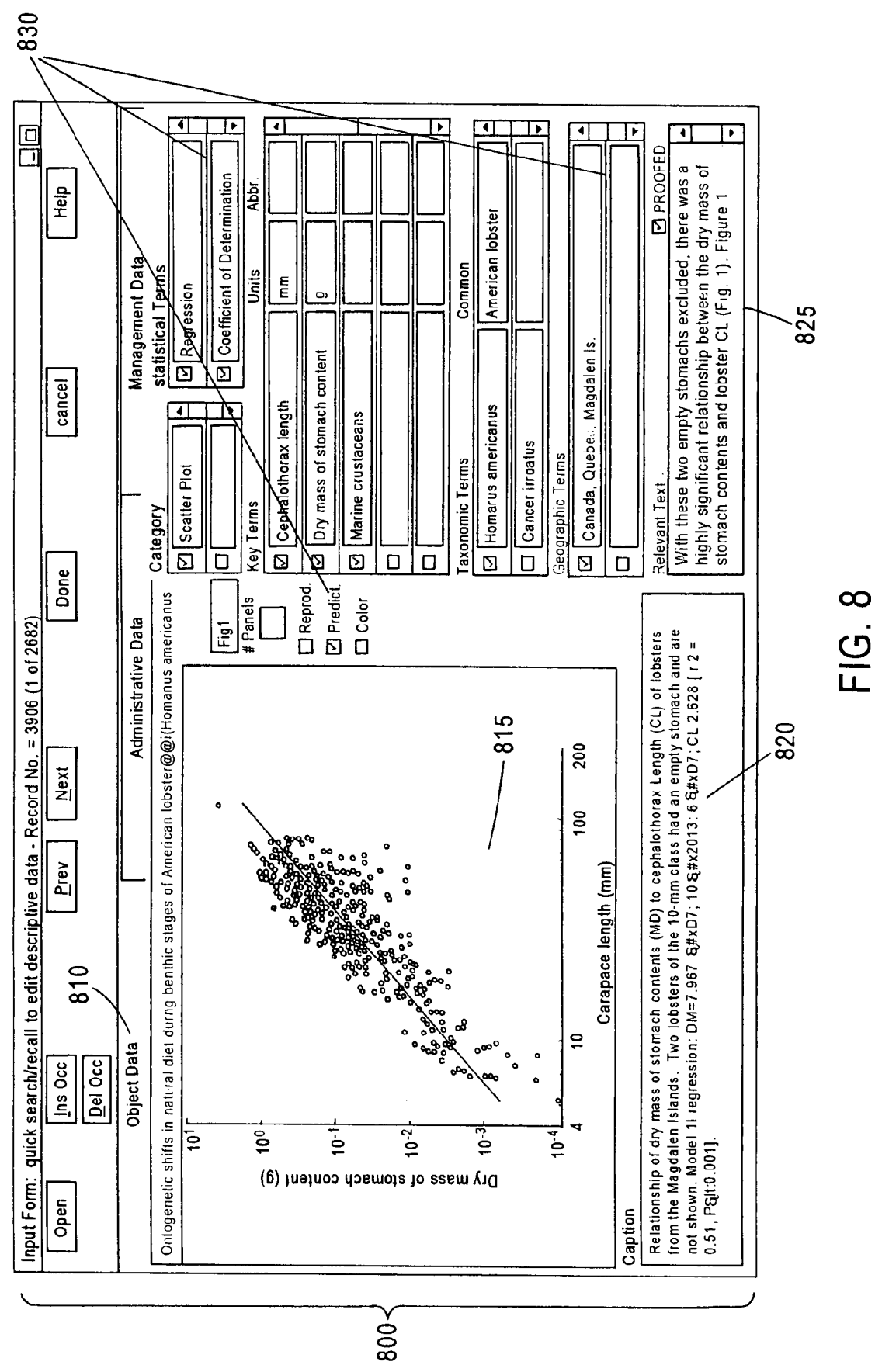

FIG. 8 is an illustration of a user-interface 800 that may be provided by Editorial Indexing sub-system 650 in accordance with one embodiment of the present invention.

According to the illustration depicted, the user-interface provides an 'Object Data' tab 810 where the captured object and its automatically extracted attributes are displayed as well as input areas for editorial corrections and descriptor assignment based on editorial rules or policies. Output display area 815 presents the image of the extracted object, and display areas 820 and 825 display the extracted caption and full-text reference, respectively. Input area 830 comprises a set of input widgets for the human editor to assign specific attribute values to the extracted object. These widgets may consist of textboxes, checkboxes, radio buttons and drop-down selection lists. When the object extraction system is configured to extract descriptor terms automatically, or if the extraction process is integrated with a Machine Aided Indexing (MAI) sub-system 655, the user interface may present pre-selected attribute values for review to the editor. According to the illustration depicted the value of 'Scatter Plot' for the attribute 'Category' may have been automatically determined and the editorial system may be configured to have this value selected by default, thereby minimizing the input time. The input selections may also be presented by way of pick-lists when multiple attribute values have been automatically extracted. For example, the extraction rules for the attribute 'Geographic Terms' may result in the identification of multiple geographic areas. Furthermore, when probabilistic extraction rules are employed, a multiple selection pick-list may display attribute values above a pre-configured threshold.

The editorial indexing step supports the requirement that a single object may be subject to the assignment of multiple sets of attribute values. For example, an object being indexed for two disparate subject areas may require entirely different values to a common attribute such as "Descriptor". In this scenario, a graph object detailing the salt concentration in different lakes may require the assignment of the descriptor value "Salinity" for a technical subject area, but the value "Saltiness" for inclusion in a non-technical database. More uncommon, but supported is the ability to assign different sets of attributes (and therefore attribute values) to a single extracted object.

The editorial interface 800 may also contain additional access points to other attributes of the extracted object. According to the embodiment depicted, the 'Administrative' tab provides access to key information about the associated 'linked' abstract record and/or full-text record. These data elements may include citation and location information. Furthermore, the location information may be displayed within the user interface as hyperlinks that, upon user selection, present the associated abstract or full-text to the user for visual inspection.

Abstract/Object Output Generator 660 performs Store Object step S450 in which the extracted and indexed object records are stored into Search/Browse indexes 670 that may be used by a Search/Browse service 680 to facilitate the search and retrieval of stored objects. Additionally, the output generator may place processed full-text and object image data into Image Repository 680 to support Display Services 685. The Output Generator's rule-base 665 supplies both business and technology rules for the extraction and storage of objects. The business rules may include periodicity of extraction, types of objects to be extracted (e.g., by publisher, by object type, etc.) and the nature of full-text and full-text image linkage. The technology rules may comprise the desired output format to support a specific search engine, destination file system locations, update/replace rules and so on. Store Object step S450 may comprise additional steps for the display of the images of the objects. For example, a uniform sized thumbnail image may be created from the originally extracted image. In like manner, an image of an object may be stored in a standard image format. In a preferred embodiment, the standard format is JPEG. In cases where the original image format is not JPEG (e.g., GIF), the objects image may be sent to an image conversion software utility that creates a JPEG equivalent. A further processing step relates to the preservation of the publisher copyright at the individual object level. For this, a 'watermarking' software application may be applied to the images of the extracted objects whereby the copyright text is overlaid onto the extracted object.

According to another embodiment of the present invention, Abstract/Object Output Generator 660 may be configured to output 'object bundles'—pre-specified sub-sets of objects and attributes—that may be used as 'feeds' to external systems and applications. For example, the extracted objects and the value-added attributes may be re-supplied back to the primary publisher as an XML feed. Alternatively, a manifest of abstracts, objects and citation information for a specific research area may be extracted and made available for download and use at a researcher's workstation. Further, these object bundles may contain security attributes for their electronic transmission or copyright attributes for which additional software applications, such as the watermarking application described, may be employed.

Associating Objects Records with Abstracts/Full-Text for Search/Browse

According to one embodiment of the present invention, Search/Browse Services sub-system 680 facilitates the objects-enhanced searching of conventional abstract and full-text indexes as well as search/browse of objects, independent of their association with the abstract (or full-text).

Figure 9:
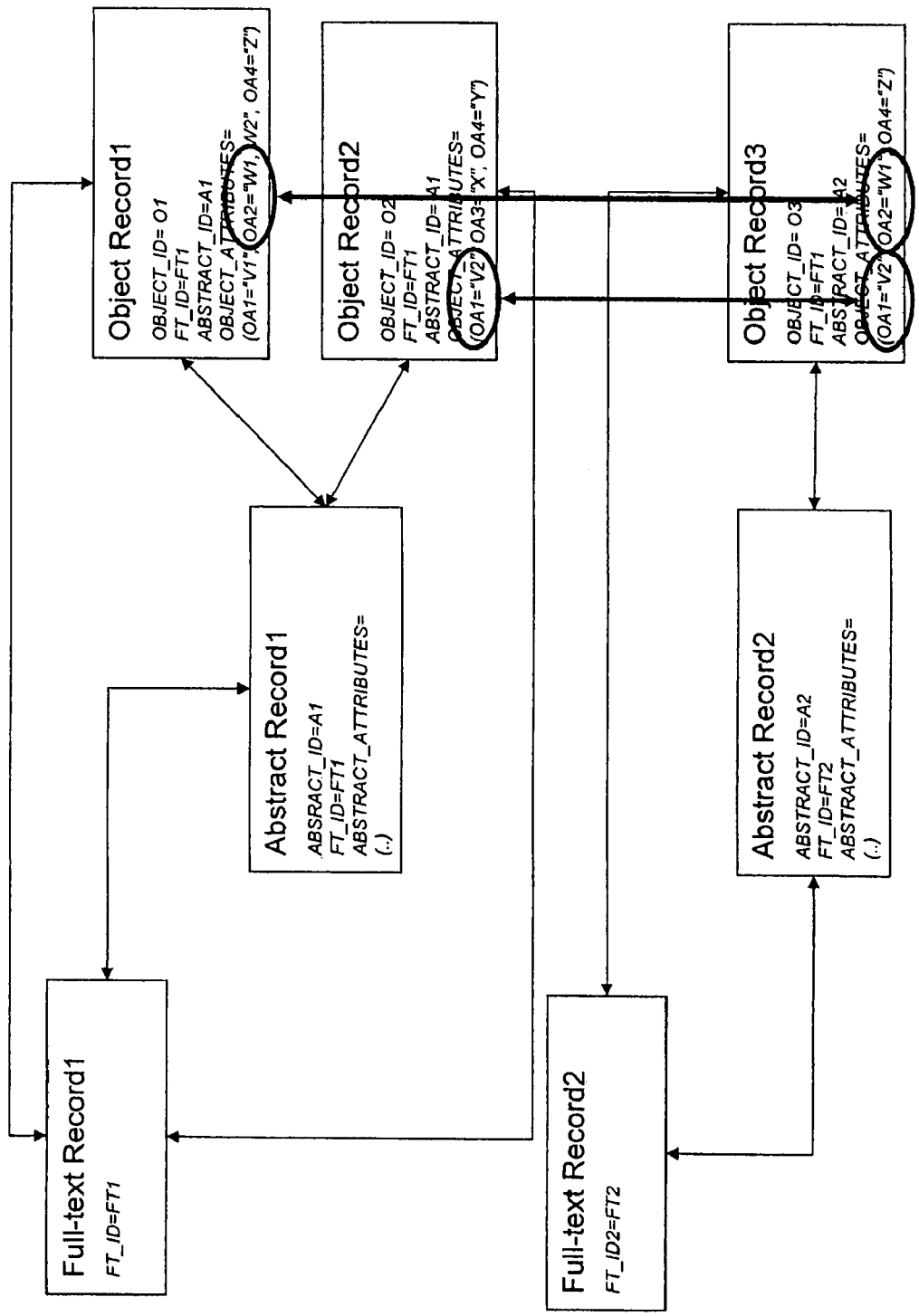
FIG. 9 graphically depicts an association between related objects and abstracts.

FIG. 9 is a diagram that illustrates the associations created by the content processing system and stored in Search/Browse indexes 670 that may be used by search/browse services 680. According to the illustration, Search/Browse index 670 contains two full-text records and their corresponding abstract records. For the purposes of simplified exposition, Full-text Record1 ("FT1", with associated abstract record "A1") is (assumed and) depicted as containing two objects ("O1", "O2") while Full-text Record2 ("FT2", with associated abstract record "A2") is depicted as containing one object ("O3"). Furthermore, in accordance with indexing step S445, each object may contain assigned or identified attributes OA1 . . . OA4 each with assigned attribute values that may be multiply occurring. In the illustration, object attribute OA1 is singly occurring (O1→"V1", O2→"V2" and O3→"V2") while object attribute OA2 is multiply occurring (Object Record1 contains values "W1" and "W2" for this attribute).

The thin arrow lines depict the links or indexes that facilitate searches across objects and abstracts (and their associated full-text). With these constructed links, a traditional search of abstract attributes (e.g., "descriptors") will retrieve abstract records that meet the specified search, but will additionally contain information about objects associated with each abstract in the result set. If the search returns abstract A1, then the associated objects O1 and O2 may be accessed by traversing the links (for example, in order to display thumbnail images of these objects). Similarly, a search of the objects attributes will contain information that could be provided to link back to the associated abstract record, or full-text record.

The thick arrow lines depict the links that facilitate an "objects only" search or browse modality, one that is independent of the abstract or full-text records from which the objects were constructed. For example, a computer user may want to find all objects that are of type "Figure" and which contain "vitamin E" as an assigned descriptor. Creating these associations in the Search/Browse Index 670 according to the method described enables unprecedented and novel searching and browsing capabilities than those offered in the art.

Figure 10:
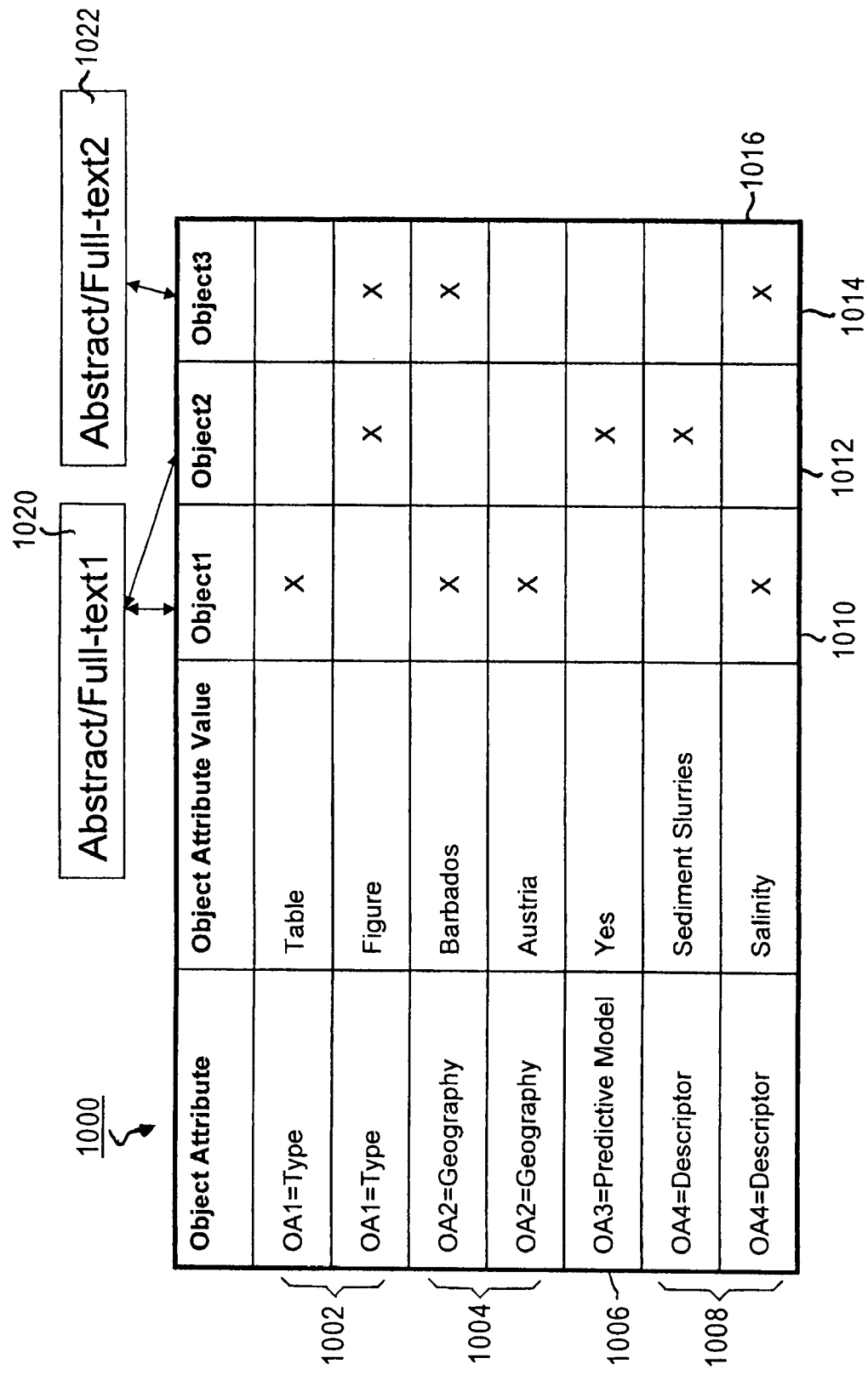
FIG. 10 provides a table that illustrates relationships between objects, attributes, and abstracts that are identifiable according to the principles of the present invention.

For the purpose of exposition, FIG. 10 is an illustration of the indexing of object attributes and attribute values according to an embodiment of the present invention described above. According to the illustration, there are four (extracted and/or assigned) attributes 1002, 1004, 1006, 1008: "Type", "Geography", "Predictive Model" and "Descriptors". These attributes may be singly occurring, multiply occurring, or be binary (yes or no). For example, the object "Type" attribute 1002 illustrates a singly occurring attribute, while "Geography" 1004 and "Descriptor" 1008 may be multiply occurring. The "Predictive Model" 1006 attribute is an illustration of an attribute that may be binary in nature whereby its value may be one of 'true' or 'false'. Using this limited set of attributes and their values, the table 1000 additionally illustrates the occurrence of these attributes and/or attribute values in the three representative objects Object1 1010, Object2 1012 (both of which are associated with Abstract/Full-text1 1020) and Object3 1014 (associated with Abstract/Full-text2 1022). Even this simple illustration reveals the advantages of indexing objects in the manner described. For example, the table 1000 illustrates a link between Object1 1010 and Object3 1014 based on the 'Salinity' attribute value 1016 of the "Descriptor" 1008 attribute. Since Object1 1010 is associated with Abstract1 1020 and Object3 1014 is associated with Abstract/Full-text2 1022, there is now an implicit link between Abstract/Full-text1 1020 and Abstract/Full-text2 1022 which may not have existed without the inclusion of objects data.

Exemplary Uses of a Captioned Objects-Enhanced Index in Information Discovery

Retrospective Searching

FIGS. 11A-11E illustrate an exemplary search user-interface 1100 which may be integrated with Search/Browse Services 680 and Display Services 685 that may be implemented on computer system 300. In general terms, the search interface allows users to:

input queries that are matched against stored indexes of both traditional abstract/full-text records and the objects index, view a result set comprising a set of records that matched the specified query, view the full record, and navigate between abstract, full-text and object components.

Search interface 1100 may also comprise a plurality of navigational links and user-interface widgets that facilitate ease-of-use and/or access to ancillary activities important to the research work-flow (for example, saving search results).

Figure 11A:
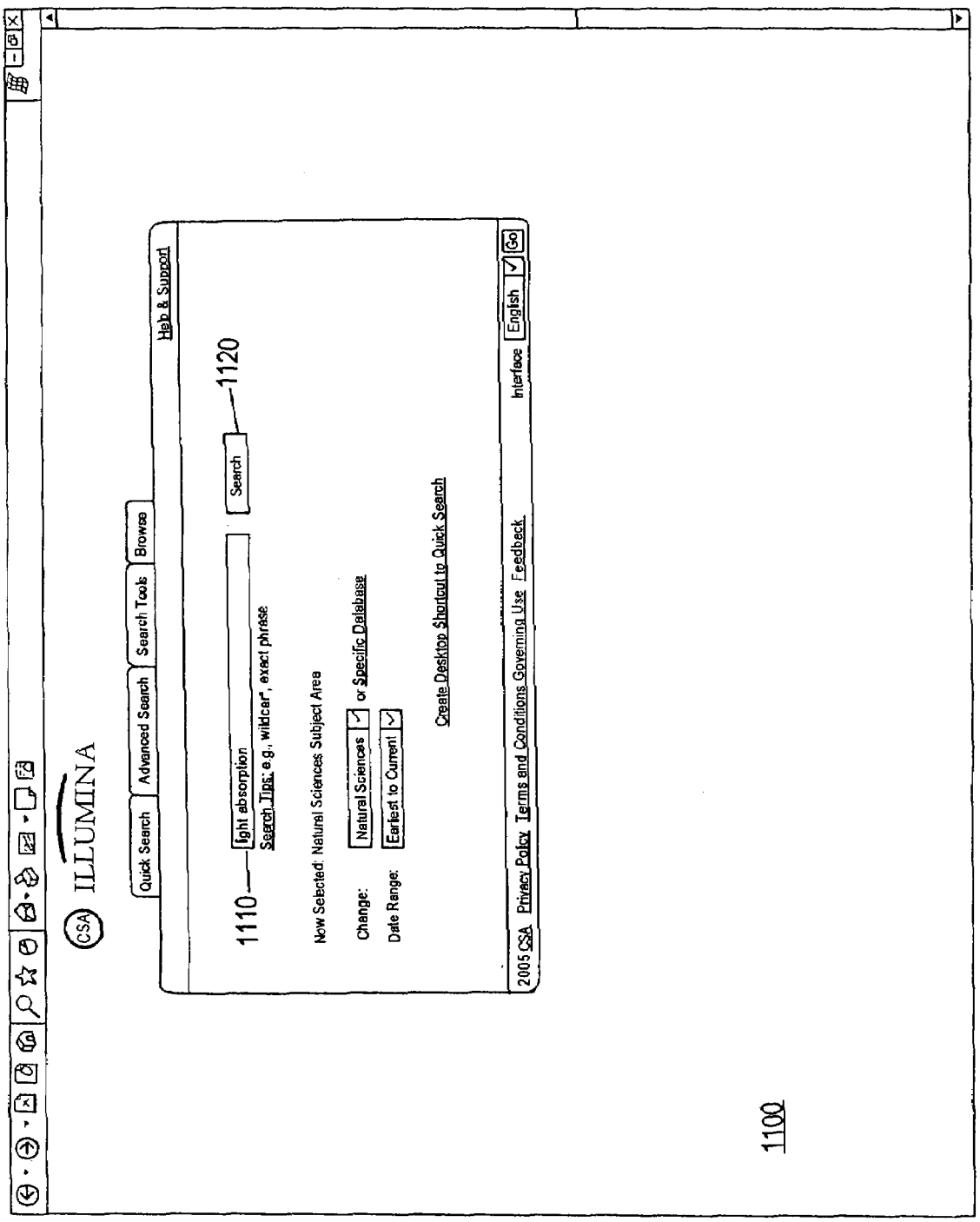

According to the illustration depicted in FIG. 11A, the query text-box 1110 allows the user to specify a query ('light absorption'). Search button 1120, when 'clicked', submits this query to a matcher in Search/Browse Services 680. The user may specify that the search be conducted against specific subject areas.

Figure 11B:
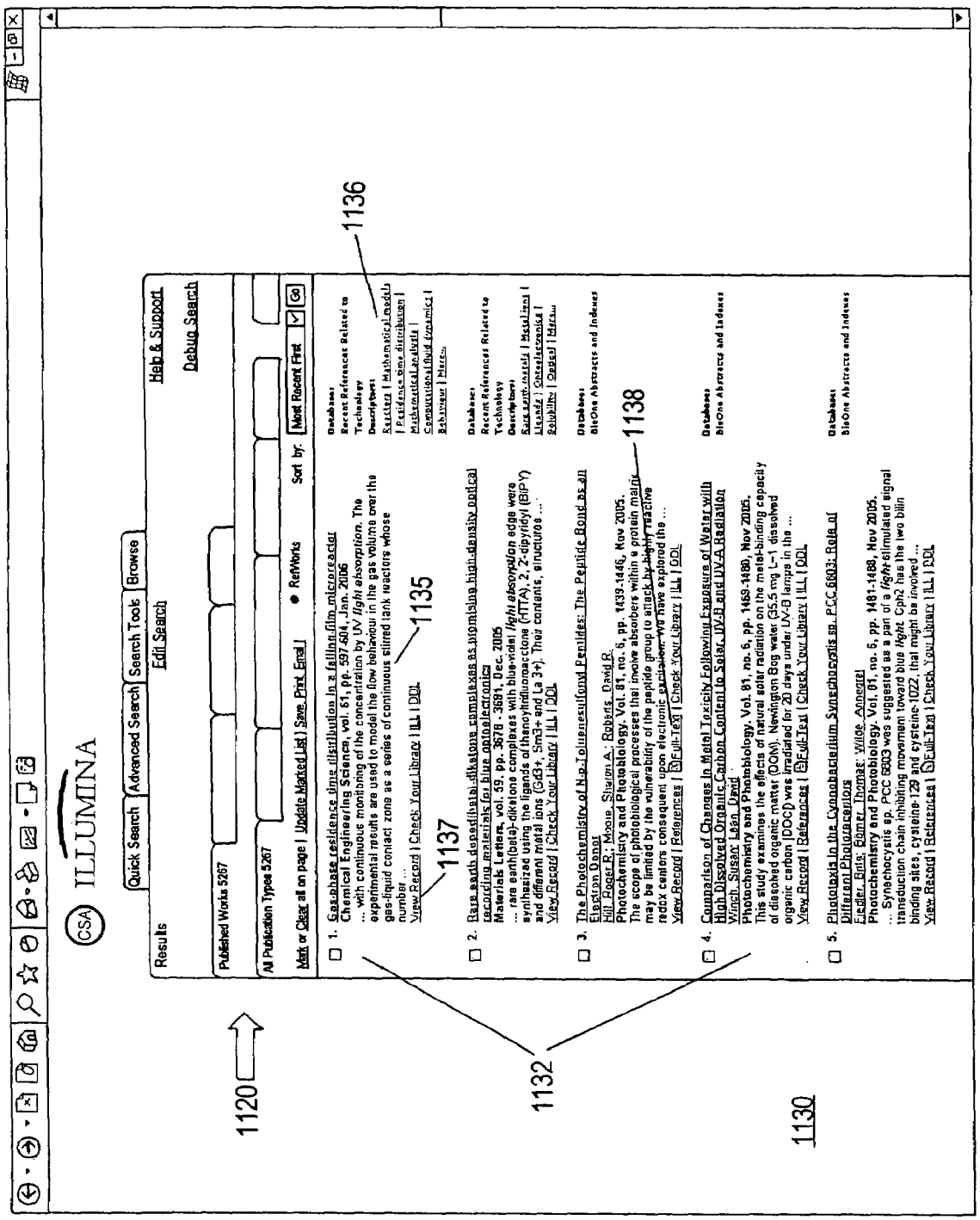

FIG. 11B is an illustration of a search results page 1130 comprising a result set 1132 displayed as a 'Summary format'. The main display consists of published works (abstracts or full-text) that matched the specified search criteria (query, subject areas and other search parameters). Each result record—such as record 1135—contains display elements by which the user may assess the usefulness of the record to his/her information need without having to view the entire record. According to the embodiment illustration, these attributes consist of the title, search terms in context fragment of the abstract text and descriptors. The descriptors 1136 that have been assigned may be hyperlinked whereby each hyperlink is in essence a pre-constructed query for the displayed descriptor. For example, should the user click the descriptor 'Mathematical models', a new search results page would be displayed containing all records that have this descriptor.

In addition to abstract record attributes, the summary view for each abstract may contain additional navigational links. For example, View Record link 1137 associated with each record summary may provide the user access to the associated full-record of the abstract. Similarly 'Full-Text' link 1138 may provide access to the print-ready version (e.g., in PDF format) of the article. In other words, when a user selects this link, a request for the article is made to Display Services 685 which, using the parameters supplied in the request, locates the required image data within Image Repository 677 and presents the data to the user.

User interface tab 1140 labeled 'Tables & Figures' in FIG. 11B is a objects index search results indicator and conveys to the user the number of object records that matched the specified query, and is also a hyperlink for the user to view the matched objects. According to the embodiment depicted, the user interface transparently performs a search of the objects index without the user explicitly selecting the objects database to be included in the search in search interface 1100. However, it should be evident to those skilled in the art that alternative user interfaces may be constructed where the choice of inclusion of the objects index as a distinct 'database' is under the control of the user.

Figure 11C:
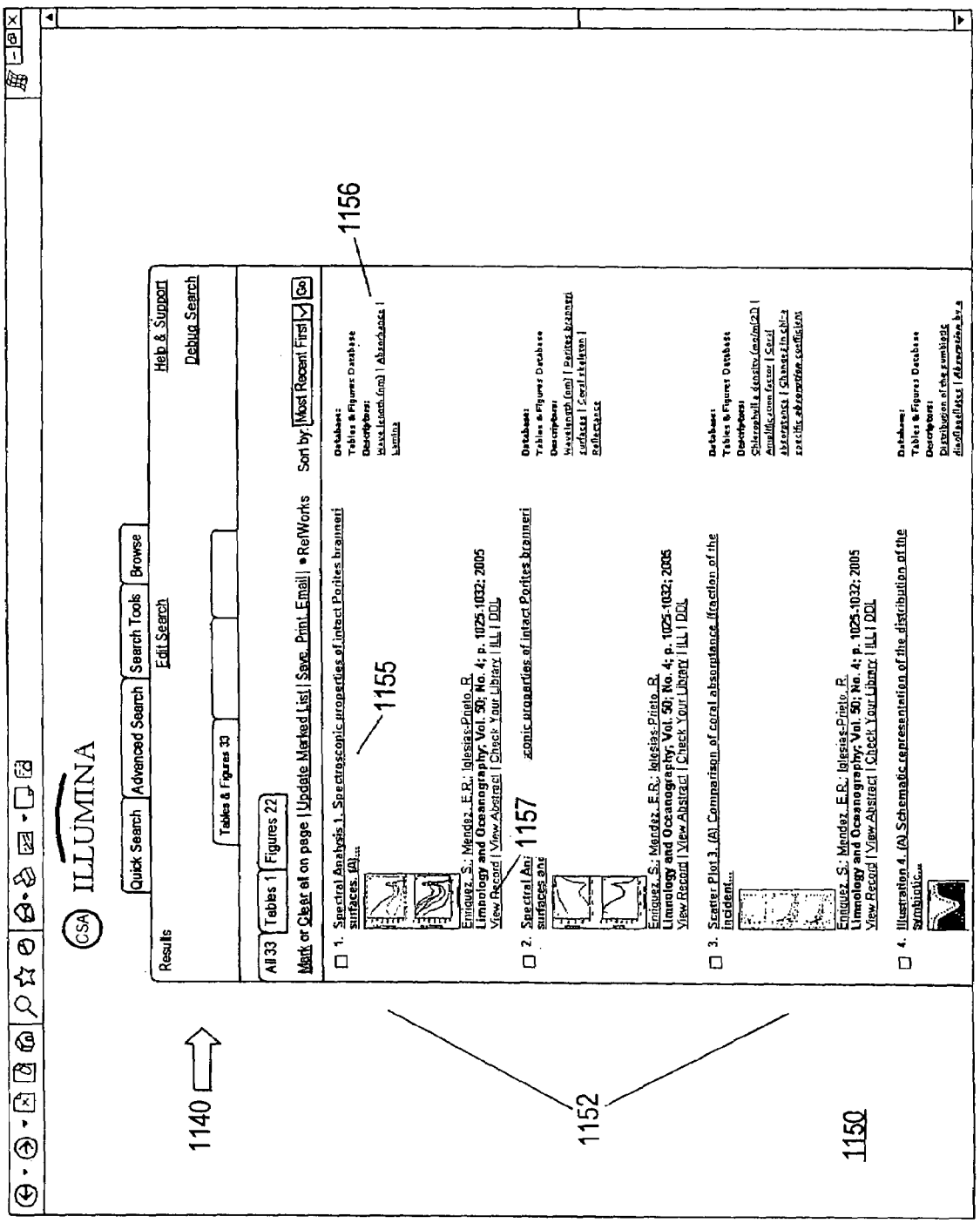

FIG. 11C is an illustration of an objects search results page 1150 displayed to the user when objects search results indicator tab 1140 is selected or clicked. Objects results set 1152 comprise a list of object records that matched the query. As with abstract summary display 1132, object summary record 1155 contains display elements by which the user may assess the usefulness of the record to his/her information need. According to the illustration, objects summary results display 1155 may consist of the caption text, a thumbnail image of the object, and its publication source and assigned descriptors 1156, which as with the abstract summary display may be hyperlinked to provide access to objects with the selected descriptor.

Furthermore, the summary display may contain additional navigational links to facilitate additional or 'detailed' access to the specific record. For example, the thumbnail image may be hyperlinked to a full-image view of the specific object. According to a preferred embodiment, the full-image of the object is provided to the user by means of a 'pop-up' window. In another embodiment, the object may be placed in a user-controlled dynamically resizable output area where the image expands or shrinks depending upon the size of the output area. Similarly, View Record link 1157 may provide access to the full contents of the objects record 1155.

Figure 11D:
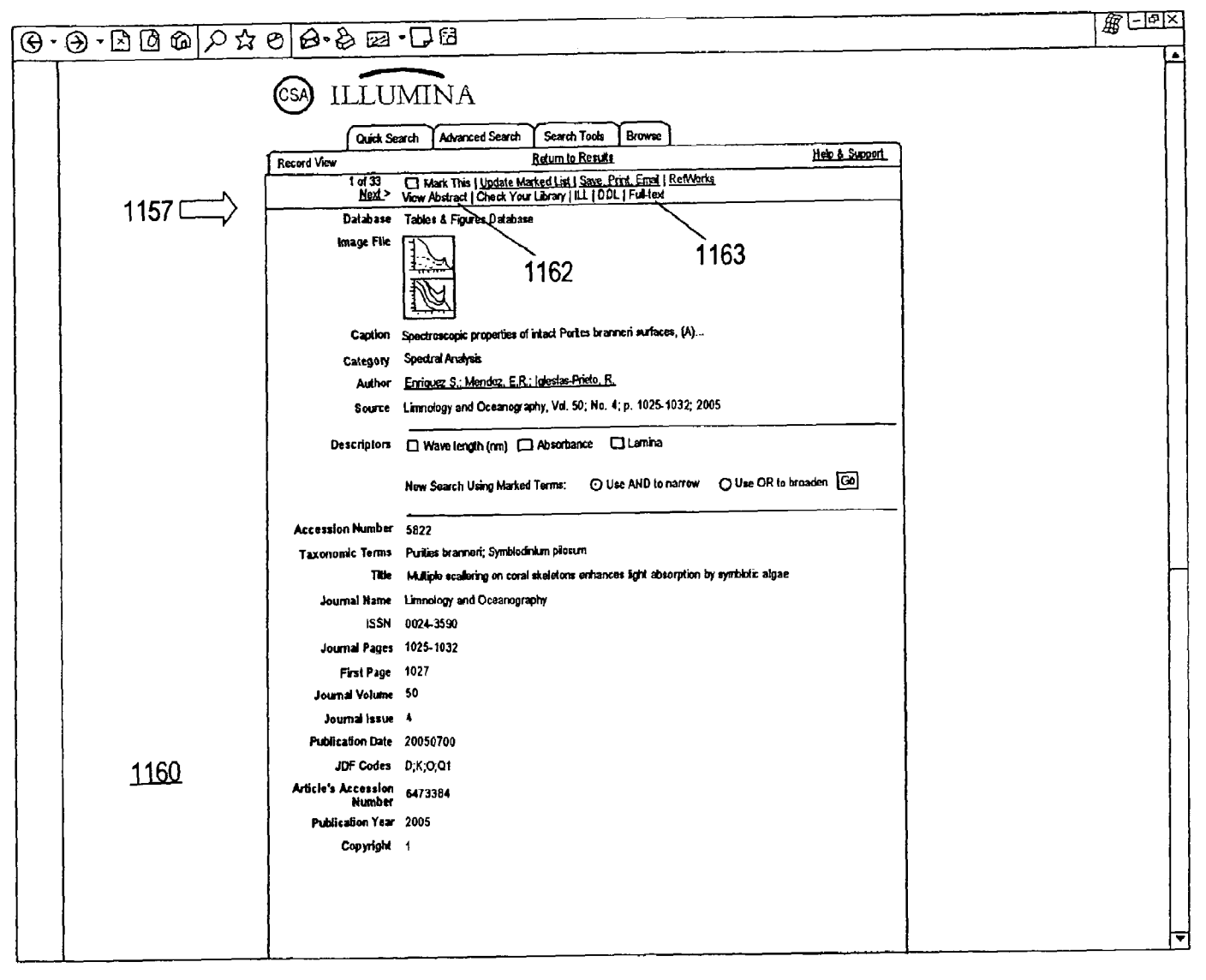

FIG. 11D is an illustration of an object record view 1160 displayed when the user clicks View Record link 1157. This display comprises the full complement of object attributes captured, indexed, assigned and stored by the objects processing framework. View Abstract link 1162 provides access to the associated abstract record attributes of the specific object. Similarly, Full-text link 1163 may provide access to the print-ready version of the article from which the specific object was extracted and indexed.

FIG. 11E is an illustration of the abstract record view associated with object record 1155. Tables & Figures attribute 1165 contains thumbnail images of the objects associated with this abstract. Object record's 1155 image is thumbnailed as FIG. 1. These images may be hyperlinked to their corresponding object record views such as object record view 1160 for FIG. 1. Thus the user is able to seamlessly navigate between objects and abstracts records bi-directionally, i.e., from abstracts to objects and vise versa.

FIGS. 14A-14E illustrate another exemplary search user-interface 1400, which may also be integrated with Search/Browse Services 680 and Display Services 685 that may be implemented on computer system 300. Generally, the search user-interface 1400 allows users to perform the same functions as search user-interface 1100.

Figure 14A:
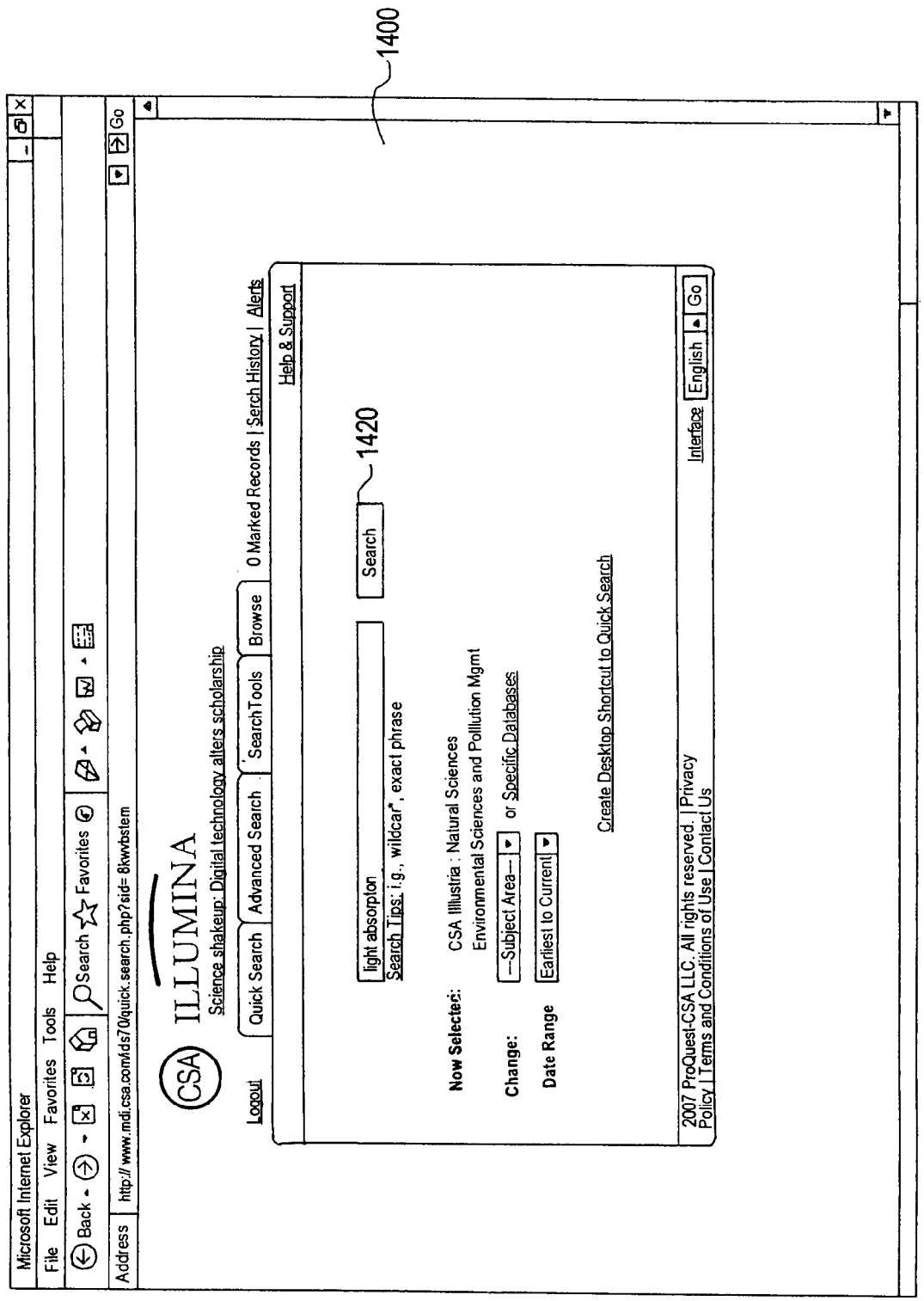
FIGS. 14A-14E depict exemplary interface screen shots of another search application involving captioned objects, including an enhanced abstract.

As shown in FIG. 14A, the query text-box 1400 allows the user to specify a search query (again, 'light absorption'). Search button 1420, when 'clicked,' submits the entered query to a matcher in Search/Brows Services 680. The user may specify that the search be conducted against specific subject areas (here CSA Illumina Natural Sciences and Environmental Sciences and Pollution Mgmt databases) or in a specified date range. One of ordinary skill in the art would recognize that there are a number of categories by which a search could be restricted.

Figure 14B:
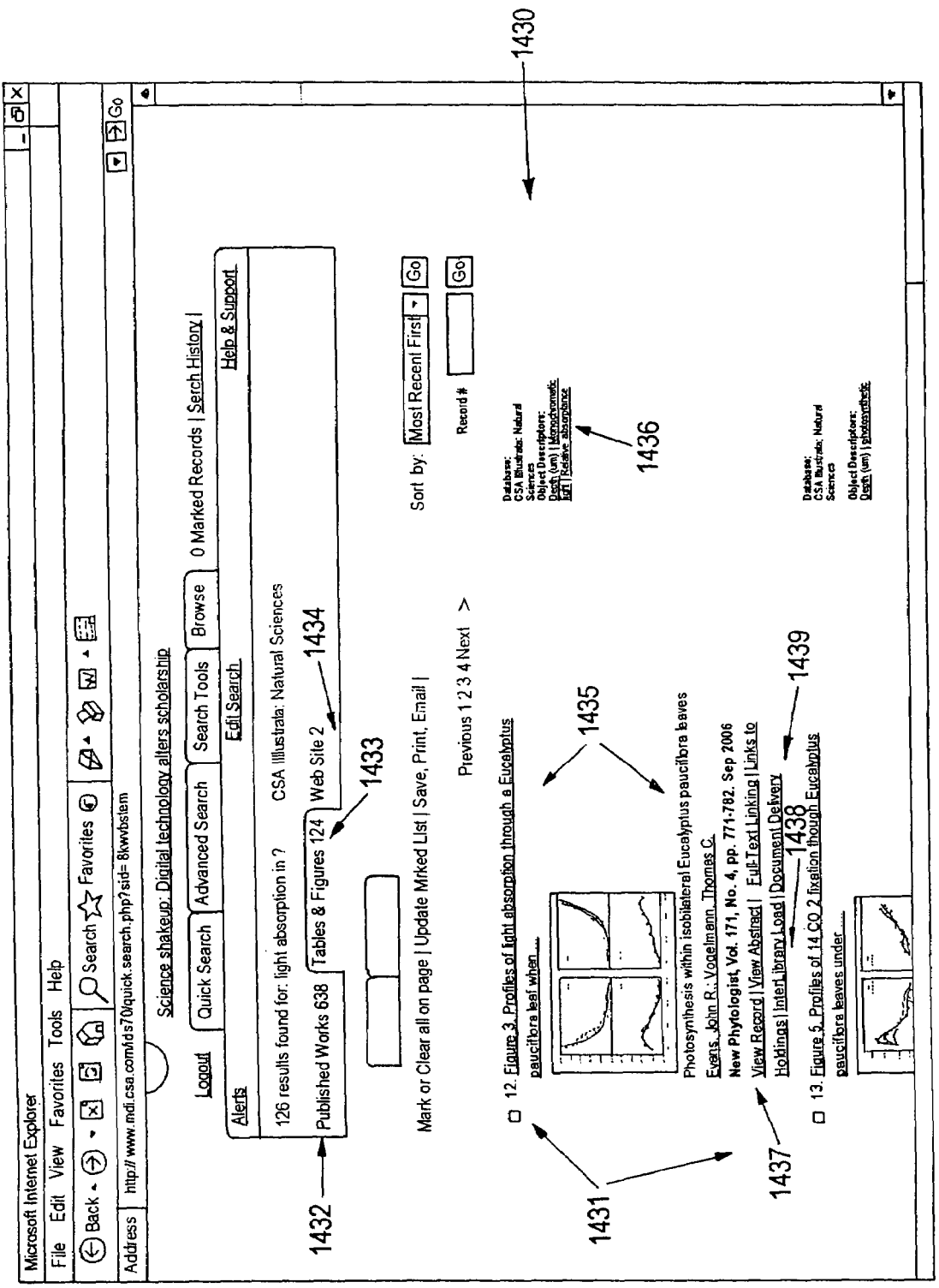

FIG. 14B is an illustration of an objects search results page 1430 (similar to that of FIG. 11C). The objects search results page 1430 includes a objects search results set 1431, which is also displayed in a "summary format." The summary objects search results set 1431 includes tabs that include Published Works 1432 (abstracts or full-text); Tables & Figures 1433; and Web Sites 1434 that matched the entered search query (in FIG. 14B, the Tables & Figures tab 1433 is the active tab. Each object result record, such as object record 1435, contains display elements regarding an object record through which the user may gain a quick understanding of the general subject matter and usefulness of the object record without having to view the entire record. In this embodiment, the summary of the record 1435 contains a title of the object, here "FIG. 3. Profiles of . . . "; a thumbnail of the object, here a graph; the title of the article in which the object appears, here "Photosynthesis within isobilateral eucalyptus leaves"; the authors of the article, here Evans and Vogelman; and the title, page numbers, and date of the publication in which the object and article appear. On the righthand side of the objects search results page, 1430, the object record summary 1435 also indicates the database in which the object appears, here "CSA Illumina Natural Sciences"; and the Object Descriptors, here Depth, Monochromatic light, and Relative absoprtance (note that light is italicized because the word light was part of the search query). In this embodiment, the Object Descriptors 1436 have been hyperlinked to allow the user to click on the hyperlink, e.g., Depth, and a new search results page(s) would be displayed containing all object records having this Object Descriptor.

Figure 14C:
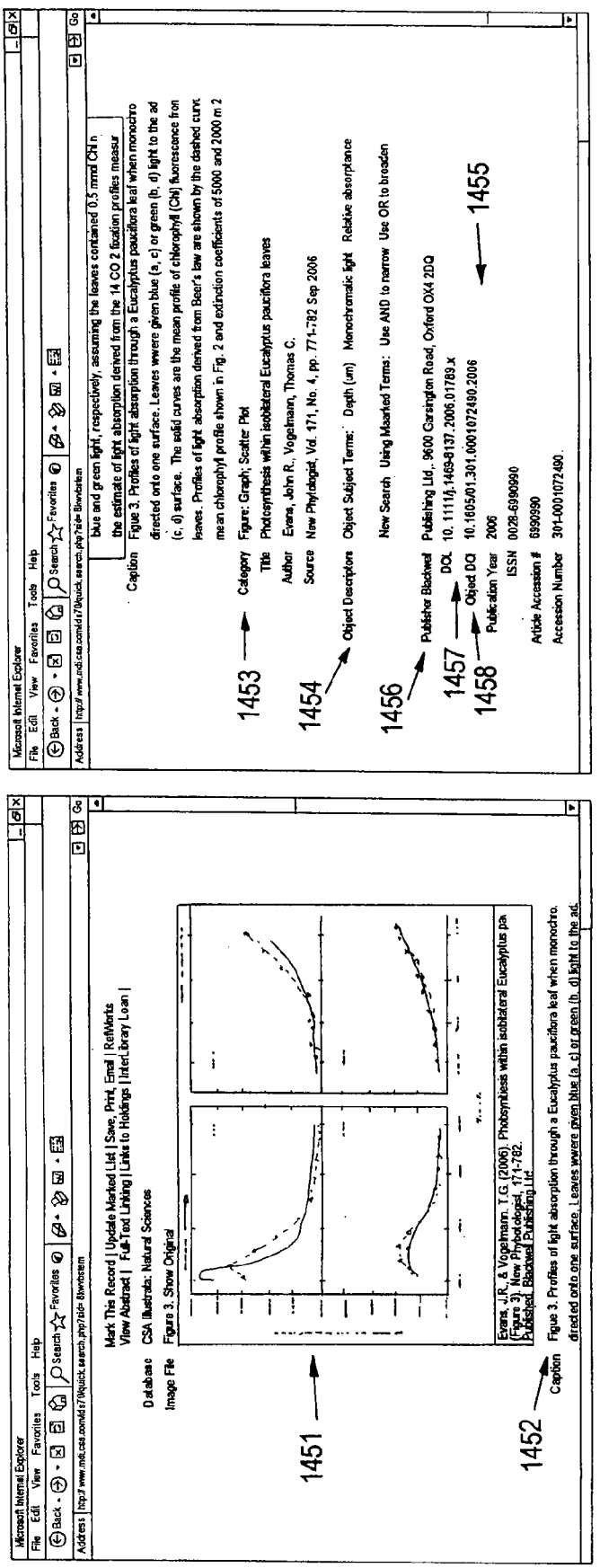

Object summary record 1435 also contains additional navigational links, such as View Record 1437, View Abstract 1438, Full-Text Linking 1439, Link to Holdings, InterLibrary Loan, and Documents Delivery. In this embodiment, the View Record link 1437 associated with each record summary provides the user access to the associated full-record of the object as shown in FIG. 14C. The View Abstract link 1438 provides access to an enhanced abstract, which is shown for object summary record 1435 in FIG. 14D. The Full-Text link 1439 may provide access to the full article or a print-ready version (e.g., in PDF format) of the article containing the object. In other words, when a user selects this link, a request for the article is made to Display Services 685 which, using the parameters supplied in the request, locates the required image data within Image Repository 677 and presents the data to the user.

FIG. 14C is another illustration of an object record view 1450, which is displayed when the user clicks the View Record link 1437 in object summary record 1435. The object record view also contains navigational links, which would allow the user to quickly access the Abstract record and the Full-Text as described above. This object record view 1450 also contains the attributes regarding the object record captured, indexed, assigned, and stored by the object processing framework. For example, object record view indicates from which Database the object comes; the Image File 1451 (with a link to the original image); the object Caption 1452, here "FIG. 3. Profiles of . . . "; the Category 1453 of the object, here "Figure, Branch, and ScatterPlot"; the title, author, and source of the article in which the object appears; and the Object Descriptors 1454 assigned to the object. By clicking on each of the hyperlinks in Category 1453, e.g., Figure, a new search result will be provided containing all objects that are categorized as a Figure.

In this embodiment, the object record view 1450 also contains a publisher attribution section 1455. Here, the object record view 1450 also displays the publisher's name 1456, here Blackwell Publishing Ltd.; the Digital Object Identifier (DOI) 1456, which are well understood in the publishing industry; an Object DOI 1457; the publication year of the object and associated article and source; the ISSN, or International Standard Serial Number, which is a unique eight-digit number used to identify a print or electronic periodical publication; and accesssion numbers. The publisher attribution section 1455 provides users with information regarding the publisher so that the user is aware of the publisher and likely holder of the copyright on the object and full-text article.

Figure 14D:
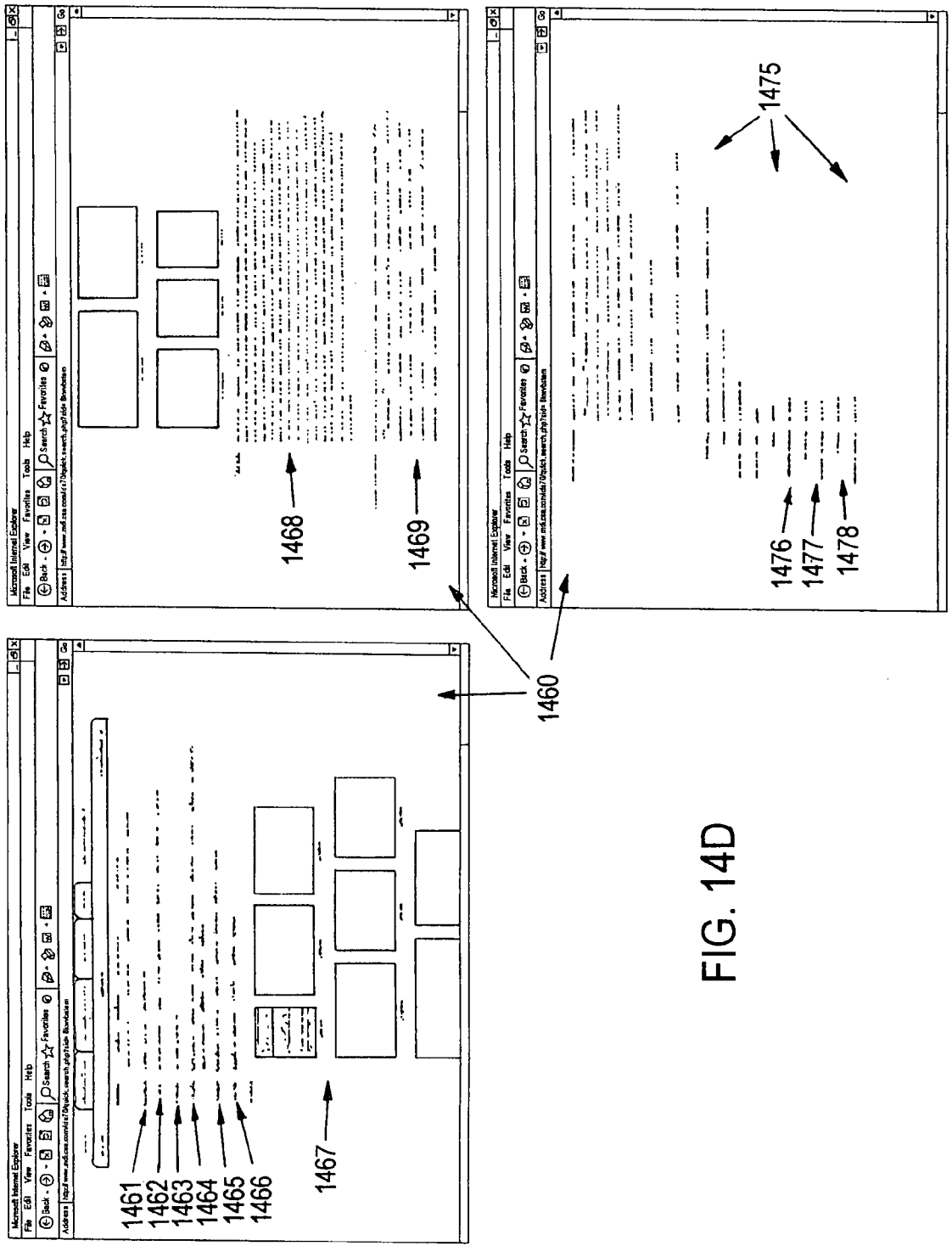

FIG. 14D contains an enhanced abstract 1460 for the article containing the object 1435. The enhanced abstract 1460 provides a great deal of useful information in summary format to aid researchers and other users in more efficiently conducting research. Again, the enhanced abstract 1460 provides the user with the name of the database 1461 where the article is located, here CSA Illumina Natural Sciences. The enhanced abstract 1460 provides the Title 1462 of the article, here "Photosynthesis within isobilateral Eucalyptus pauciflora leaves." The enhanced abstract 1460 also provides the names of the authors 1463 and their affiliations 1464, e.g., where an author is employed, teaches or is affiliated. The enhanced abstract 1460 provides the source 1465 of the article containing the object 1435. The enhanced abstract 1460 details some interesting notes 1466 about the article, e.g., the number of figures, tables, formulas, and references appearing in the article. The enhanced abstract 1460 also contains thumbnails of all the objects 1467 appearing in the article.

Figure 14E:

When a user holds a cursor over an object 1467 (e.g., FIG. 1 in enhanced abstract 1460), an information balloon 1490 shown in FIG. 14E appears providing the user with the caption 1491 of the object; the Category 1492 of the object; and the Object Descriptors 1493. The Category 1492 and Object Descriptors 1493 are hyperlinked so that user can search by clicking the hyperlinks to receive the results as described above.

The enhanced abstract 1460 of FIG. 14D also contains a standard abstract 1468. As compared to the abstract record and enhanced abstract 1460, abstract 1468 is a brief summary of a research article that is often used to help a reader quickly ascertain the article's purpose (an abstract almost always appears at the beginning of an article to act as the point-of-entry for a given article).

Enhanced abstract 1460 also contains a listing of all the assigned object descriptors 1469 that have been assigned to the objects appearing in the article. Each of the object descriptors has an empty check-box, which allows the user to check the box if the user wishes to conduct another search using the checked terms. The enhanced abstract 1460 allows the user to run this additional search using the checked Object Descriptors with an "and" logic or an "or" logic by checking a box; but one of ordinary skill in the art would understand that any search logic could be implemented.

The enhanced abstract 1460 also contains publisher attribution information 1475, which provides much of the same information that was provided by the publish attribution information in the object view record of FIG. 14C. In addition, the publisher attribution information 1475 of the enhanced abstract 1460 provides the electronic ISSN 1476 of the article; the language 1477 in which the article is written; and the last update 1477 of the article.

Those skilled in the art will recognize that, while the enhanced abstract 1460 is described as containing certain fields, an enhanced abstract according to the present invention could be implemented using more fields, different fields, or fewer fields without departing from the invention.

Those skilled in the art will recognize that the objects enhanced extraction and indexing may also be incorporated into other search-based work flow applications such as an alerting service whereby newly added objects are matched against a database of stored queries and users are proactively notified (e.g., via email) about any objects that match their stored queries.

Captioned Objects Browsing

Figure 12A:
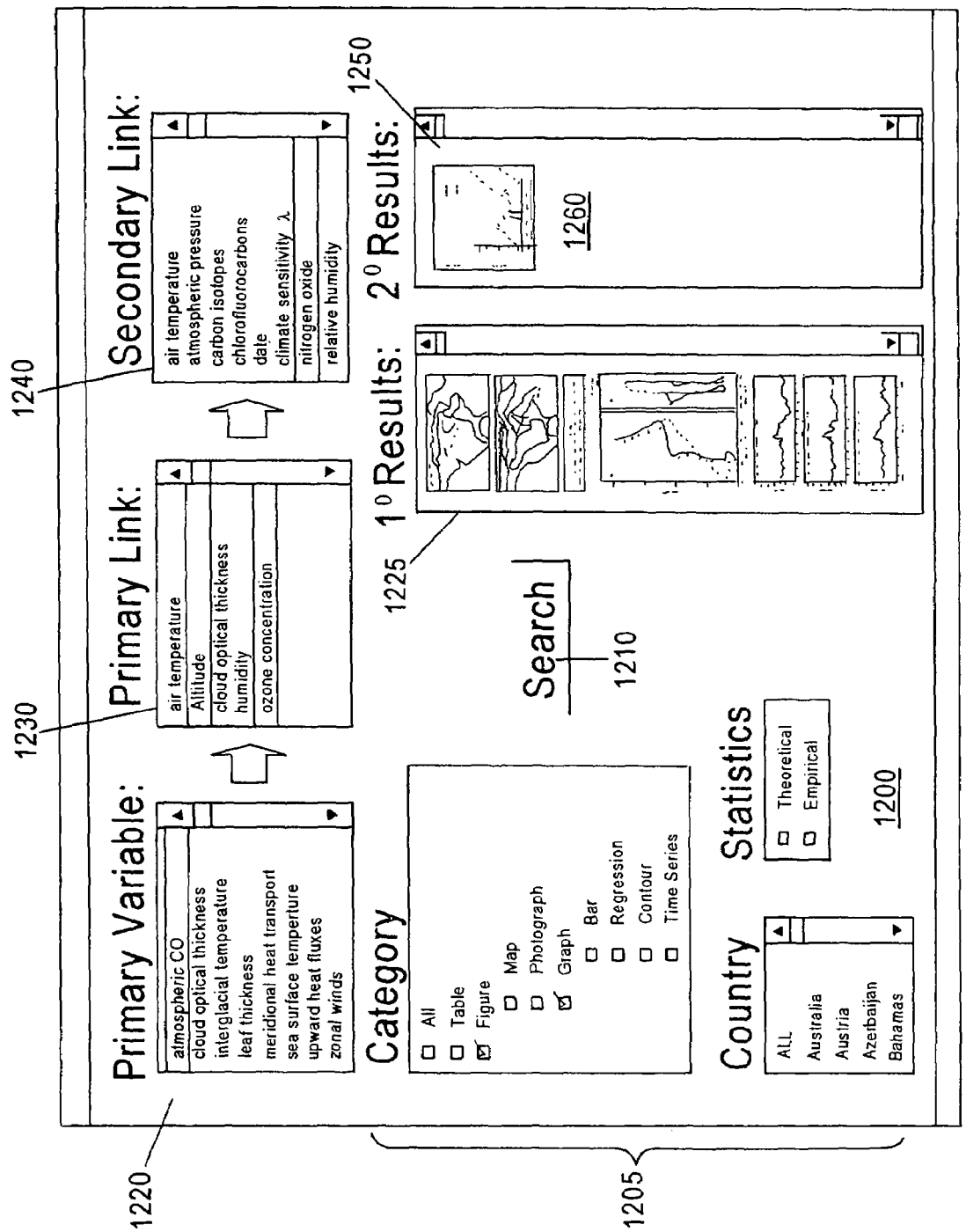
FIGS. 12A and 12B depict exemplary interface screen shots of another search application.

FIG. 12A is an exemplary graphical user-interface 1200 that embodies a novel information discovery technique according to one aspect of the present invention. Specifically, the interface depicted allows a user to specify an objects search criterion and then browse or traverse the indexed linkages using an arbitrary object as the starting point for the traversal.

Criteria selection area 1205 comprises user-interface widgets to specify an initial sub-set of objects of interest, based upon attributes of the object records in the index. According to the illustration depicted, a Category checkbox list may be presented for the user to indicate the type of objects to be included, a geographic area or Country drop-down list and a check-box to indicate the nature of the statistical analysis performed. According to the illustration depicted, the user has selected to retrieve all objects that are of type "Graph". When the user presses search button 1210, all objects that satisfy the selection criteria are retrieved. Drop-down box 1220 is populated with the list of unique primary variables associated with the records in the search result set. Simultaneously, drop-down box 1225 is populated with thumbnail images of the objects that match the specified search criteria. These thumbnail images may be hyperlinked to provide access to a full-size image or alternatively a full record view of the object.

After viewing the initial results, the user may select specific primary variables of interest by clicking on the text labels listed in drop-down box 1220. When the user indicates a specific primary variable ('atmospheric CO'), the user-interface is refreshed simultaneously in Results drop-down 1225 and Primary Link drop-down box 1230. Results drop-down box 1225 now contains only those objects which have the selected primary variable 'atmospheric CO'. Primary link drop-down box 1230 is populated with the variables that are directly associated with the selected primary variable. According to the illustration depicted, at this point, the result set contains graph objects that associate 'atmospheric CO' to 'air temperature', 'Altitude', 'cloud optical thickness', 'humidity' and 'ozone concentration'.

To navigate to the second-level associations, the user may indicate specific variables of interest from Primary Link drop-down box 1230. According to the illustration depicted, the user selects 'Altitude' and 'ozone concentration'. Upon making these selections, a search (according to the same criteria as originally specified by the user) is conducted to retrieve all objects that are associated with these variables. Secondary Link drop down 1240 is populated with variables associated with the selected primary link variables. Simultaneously, hyperlinked thumbnail images of the objects are presented in Secondary Results box 1250. The user may then further filter the result by selecting a specific secondary link of interest. According to the illustration depicted, the user selects 'nitrogen oxide', resulting in secondary search results box 1250 being refreshed with thumbnail images of only those objects that meet this selection criterion (1260).

Figure 12B:
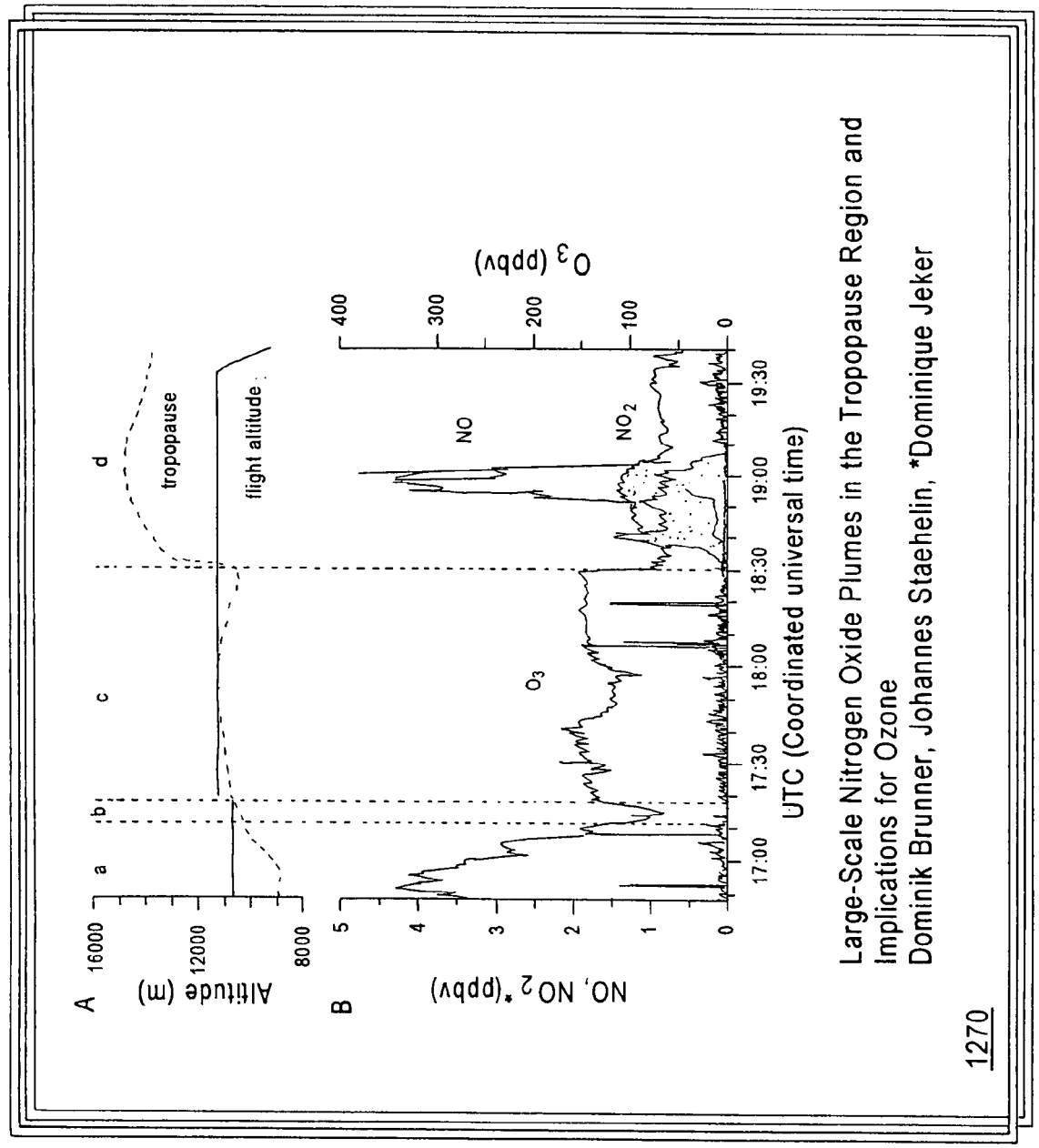

FIG. 12B is an illustration of the full-image view of hyperlinked thumbnail image 1260 and is a graph object showing the relationship between the user selected primary links—'altitude' and 'ozone concentration'—and secondary link 'nitrogen oxide'. By browsing the linkages between objects the user is thus able to discover a potential relationship between the original variable of interest—'atmospheric CO'—and an indirectly linked variable 'nitrogen oxide'.

In summary, indexing captioned objects can be immensely valuable to a researcher interested in linking variables within or across disciplines. For example:

1) Acutely-targeted publication searches can be crafted by employing objects oriented searches rather than traditional article level searches.

2) Researchers can find tables and figures containing specific variables, ensuring that the study actually focused on that variable, rather than simply referring to it indirectly (i.e. from another publication).

Example: A Google Scholar™ search, or a search using other search engines, for a time series of sea surface height off the Galapagos may retrieve many publications that do not actually contain data on sea surface height off the islands. (In fact, many of the results may stem from a match in the cited references and not the actual article). Similarly, a traditional A&I database search would not guarantee a result list of articles containing the required quantitative information. However, results from a captioned objects index, constructed in accordance with embodiments of the disclosed invention, would include records where those data were actually part of the search.

3) Categories of objects can be easily browsed (e.g., all photomicrographs of bacteria; all graphs containing a particular variable; all tables listing a specific element; etc.) Making visuals for conference presentations or seminars can be greatly facilitated.

4) Spurious correlates can be identified by linking dependent variables through a series of independent variables. For example, a dependence of lobster population density on sediment grain size found in one study, may actually be a dependence on bottom current speed, the controlling factor of grain size elucidated in another study that had nothing to do with lobsters and therefore not 'on the radar' of the lobster researcher.

Another example: Consider two lines of research on Maximum Sustainable Yield (MSY) in marine fisheries, one in Fisheries Oceanography and the other in Sociology. Both studies develop a predictive MSY model based on sea surface temperature (the oceanographer) and on landing statistics in the context of fishermen ethics (the sociologist). Both avenues of research would benefit from the ability to easily link a specific variable to all other independent variables in many subject areas. Indexing captioned objects does not simply help answer research questions; rather, in conjunction with an objects capable computer user interface, it provides a unique tool with which researchers can pose questions for future research.

Exemplary Use Cases

FIGS. 13A-13H accompany exemplary use cases for embodiments of the present invention. These use cases involve oceanography specifically but provide exemplary evidence, in general, of the usefulness and advantages of indexing and linking nontextual information available from articles.

Advantage 1: Identifying Data from Unlikely Sources.

One advantage provided is that such a system enhances the ability to identify data from unlikely sources. Physical oceanographers often require hydrographic information for their ocean current models, yet their own data are often restricted to narrow cruise tracks. The ability to broaden their models to include areas where they did not sample is contingent on identifying other studies which may contain the data. These data may be hidden in the traditional article-level indexing because data in a specific figure or table may not be reflected in the title or summary. A full-text search would identify hundreds of irrelevant publications which may mention a specific variable but not contain corresponding data.

Figure 13A:
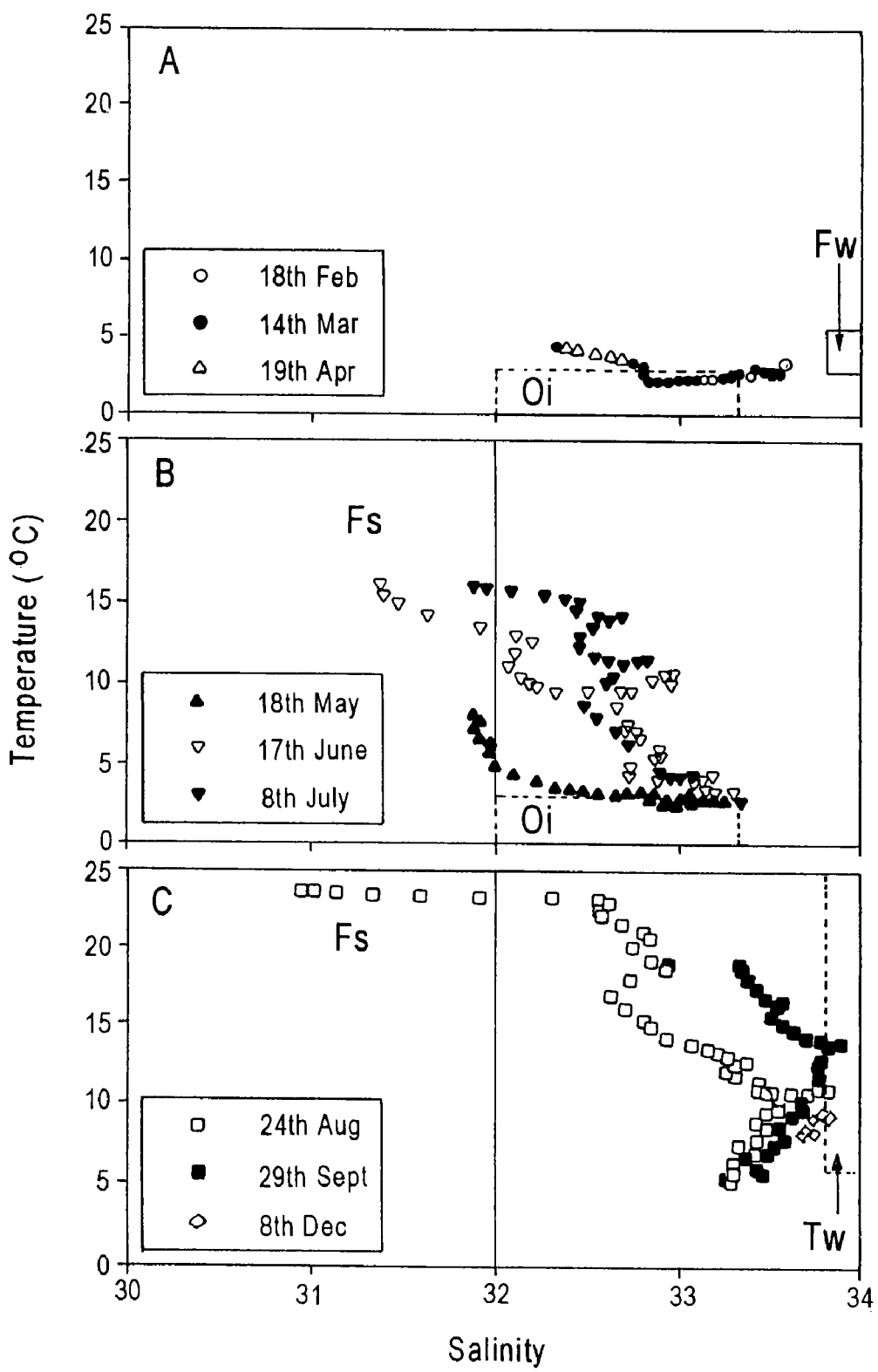

Specifically, temperature/salinity or "T/S" diagrams, such as those in FIG. 13A are invaluable to physical oceanographers. These graphs are from "*Bacterial abundance and production and heterotrophic nanoflagellate abundance in subarctic coastal waters (western North Pacific Ocean)*", Aquatic Microbial Ecology, 23(3) 2001, 263-271. Thus, FIG. 13A would be quickly identified in an object database even though the context of the research is biological rather than physical, as evinced by the article and journal title.

Advantage 2: The Use of an Indexed Object Database Also Simplifies the Ability to Identify Spurious Factors.

Example—One might assume that the growth of microscopic algae (i.e., "primary production") in the Gulf of Alaska is limited by the amount of available nutrients (e.g., Nitrogen concentration, either as nitrate or nitrite).

Figure 13C:
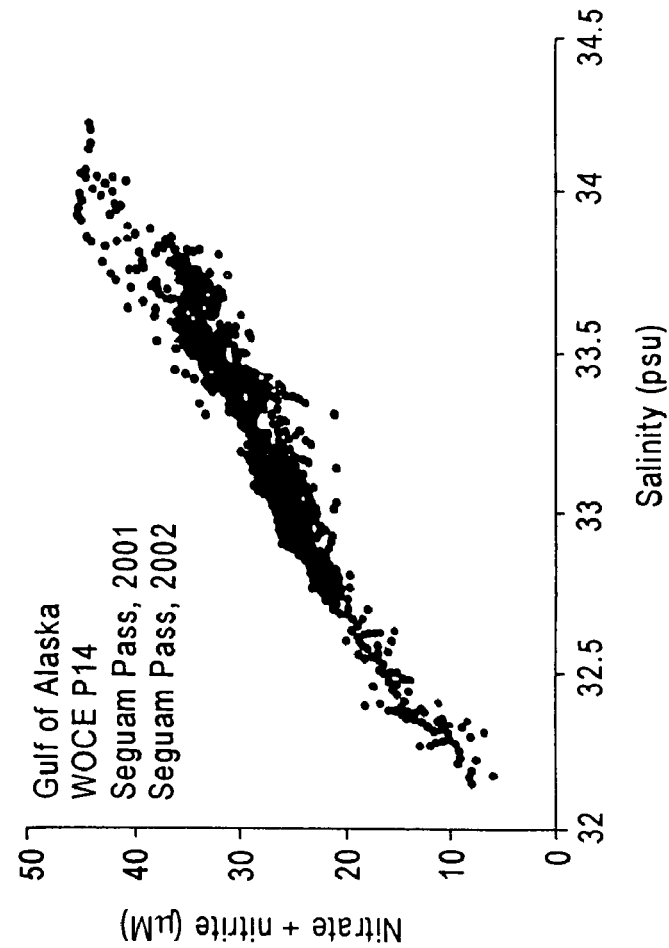
Figure 13B:
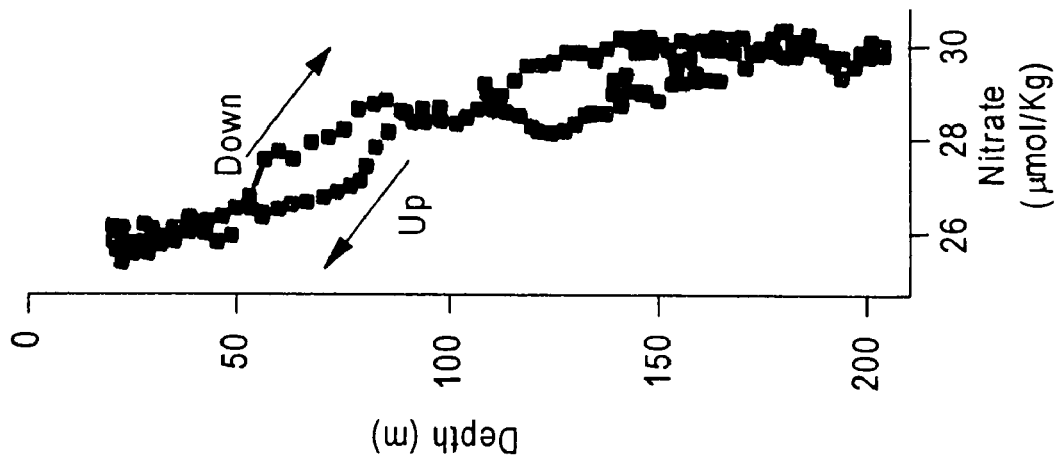
Figure 13E:
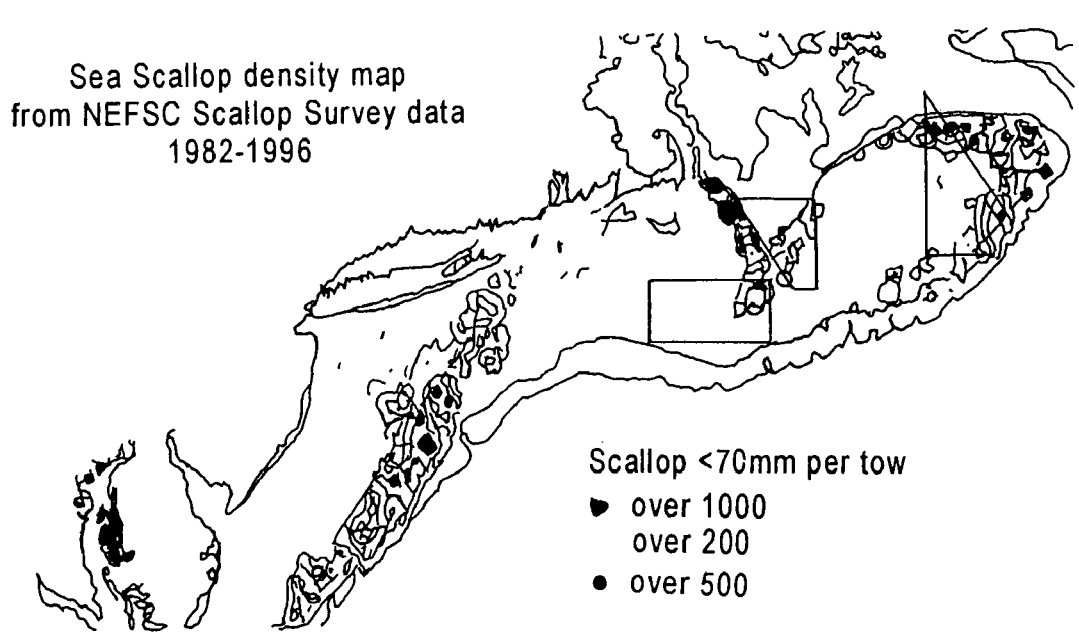

How can the assumption be tested? If there are measurements of primary production at a study site but there is no corresponding nitrogen data, then how is the assumption tested? A quick search of the objects database may identify a publication containing the nitrogen data for the study site, as shown in FIG. 13B.

This allows plotting of the primary production data against these values of nitrogen to determine if there is a possible correlation. It is possible, however, that even if a correlation exists, the factor controlling primary production may not be nitrogen, but some other variable that controls nitrogen distribution. Again, a search of the object database for variables linked to nitrogen might reveal the information of FIG. 13C.

Discovery of secondary or spurious correlates—The graph of FIG. 13C suggests that other variables may be important to primary production. Nitrogen concentration may be dependent on salinity, and if so, maybe primary production is linked to salinity and not to nitrogen concentration; i.e. nitrogen concentration is a spurious correlate.

Why would salinity be important to primary production? If a search for variables linked to salinity identifies the table of FIG. 13D, then a relationship between salinity and turbidity can be shown. Because turbidity is a proxy variable for light attenuation, perhaps light controls primary production? Thus, a conclusion may be reached that perhaps more research on turbidity and primary production is warranted.

Advantage 3: Ability to Identify New Avenues of Research.

Starting with the realization that sea scallop density on Georges Bank is concentrated on the northern flank (see FIG. 13E), the question remains why is the density so high here, and not towards the central bank where primary production is higher?

Figure 13F:
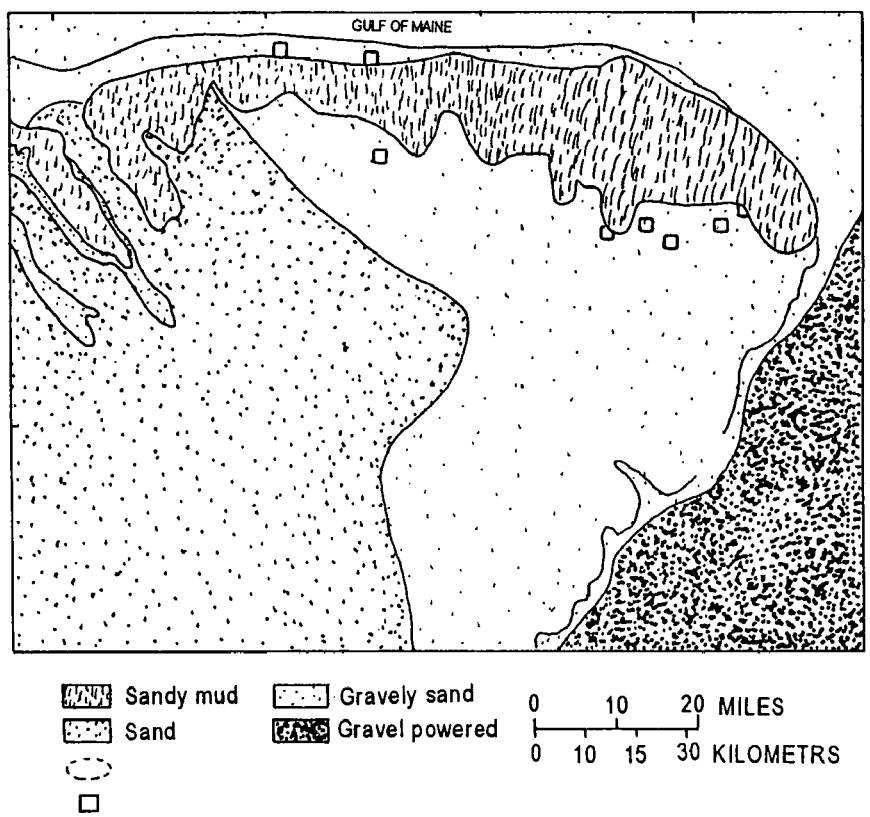
Figure 13G:
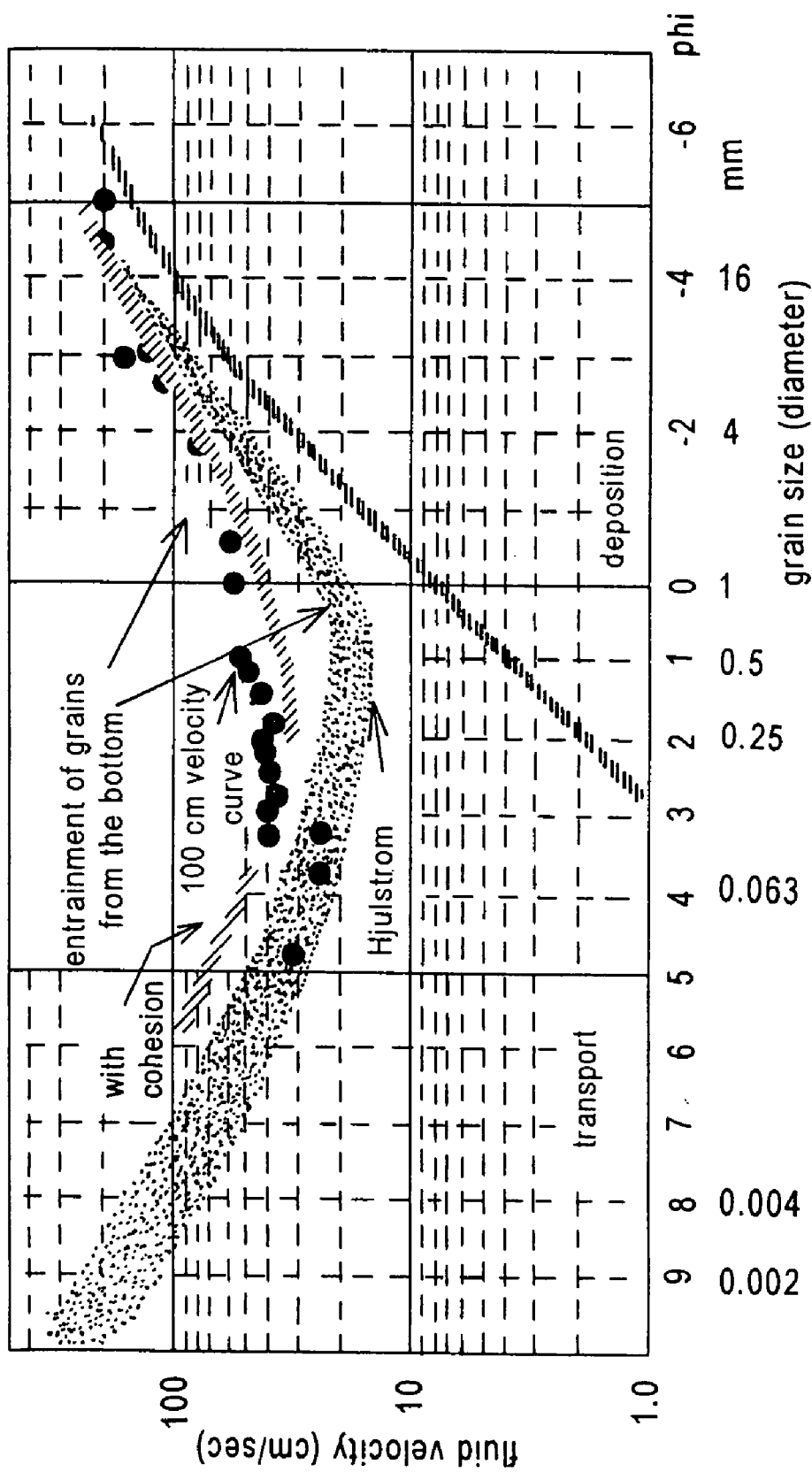

A quick search for maps of Georges Bank in the objects database may reveal several variables which have similar patterns to scallop density. For example, FIG. 13F shows that scallops are concentrated in a gravel area.

Why would scallops prefer to settle on gravel rather than mud or sand (where food is more plentiful? Perhaps there is a secondary factor: What variables may be linked to the sediment size distribution? Another search of the object database may locate a figure or graph that shows that grain size is related to current velocity, as does FIG. 13G.

Figure 13H:
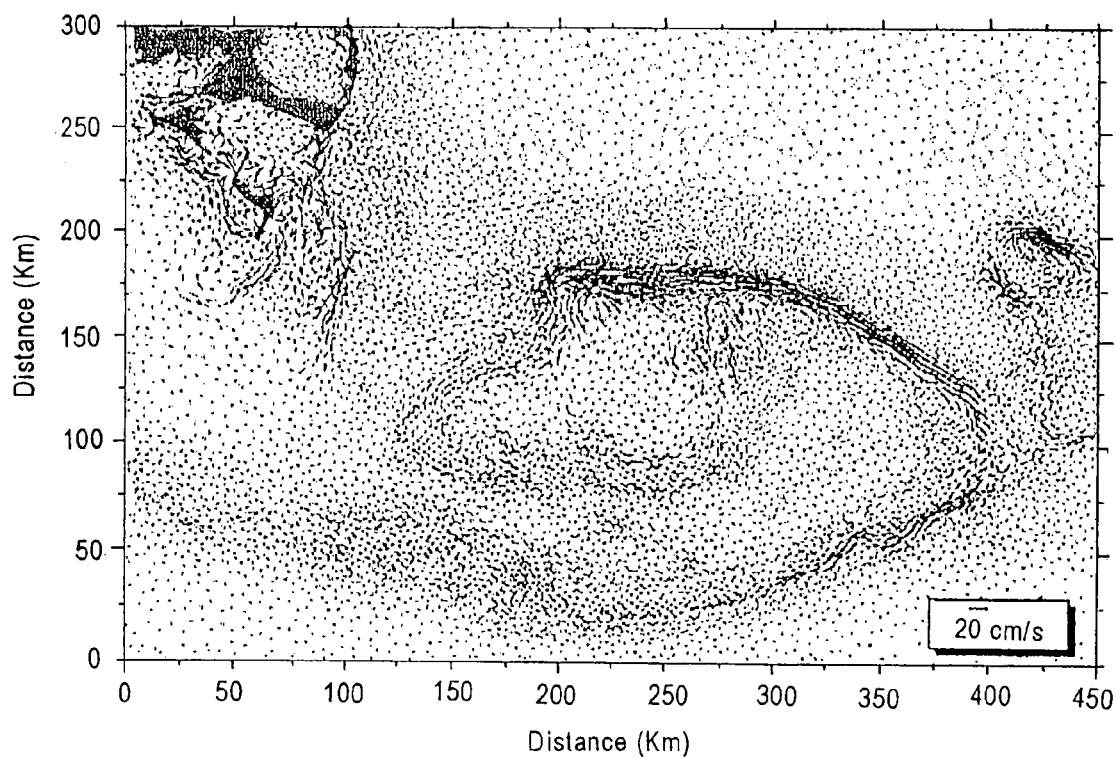
Figure 13I:
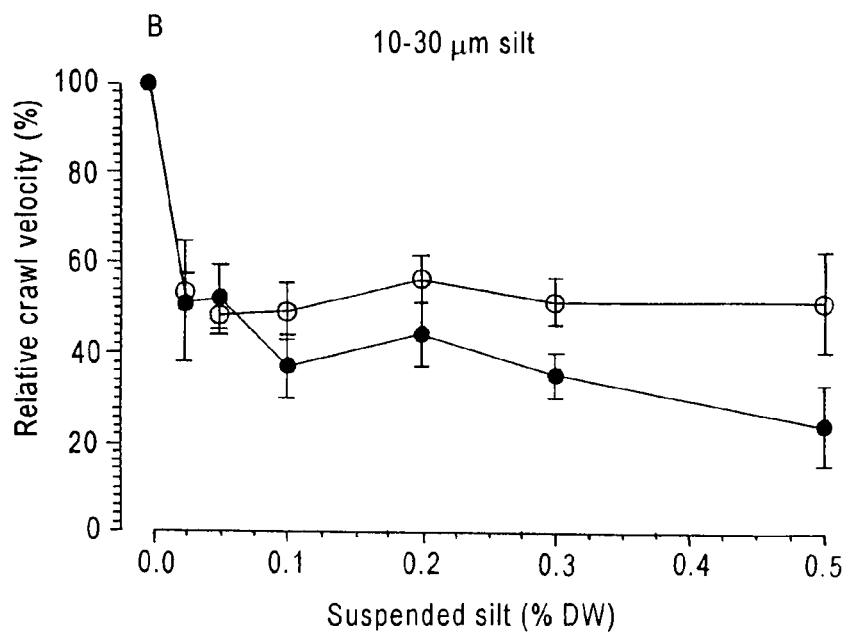

Perhaps current velocity is more important to scallops than substrate size. A search of the object database may allow evidence to be found that supports the hypothesis that current velocity on Georges Bank varies in the same manner as scallop distribution. For example, FIG. 13H shows the M2 residual currents on Georges Bank. Clearly, scallops are abundant where currents are high. But what variables are linked to current speed that may be important to scallops? In areas of high currents, suspended silt concentration is extremely low. A search for suspended silt concentration in the object database may find that silt lowers the ability of scallops to feed (i.e. relative crawl velocity of ciliary sections is lower). The distribution of scallops, therefore, may reflect increased mortality of scallops in low flow areas. Perhaps this possibility identifies an area for further research.

CONCLUSION

A number of variations to the specific behaviors and steps described in the above examples may be made without departing from the scope of the present invention. The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An automated method of processing at least one document containing at least one object, comprising:
    extracting data from each of the objects in each of the at least one document into an object record;
    linking each object record, including the extracted data, with its associated one of the at least one document including generating a document record; and
    storing each linked object record in a computer readable medium;
    wherein the extracting includes extracting predetermined attributes associated with the at least one object responsively to extraction rules specifying types of the predetermined attributes to be identified and extracted; and
    wherein the linking provides links between object records having a same value of a respective type of the predetermined attributes, the linking further including generating an index.

2. A system for collecting data from a plurality of objects contained in a plurality of documents, the system comprising:
    a computer;
    means in the computer for extracting data from each of the plurality of objects into an object record;
    means in the computer for linking the data extracted from each of the plurality of objects with an associated one of the plurality of documents including generating a document record; and
    means in the computer for storing each linked object record, including the extracted data;
    wherein the extracting includes extracting predetermined attributes associated with each of the plurality of objects responsively to extraction rules specifying types of the predetermined attributes to be identified and extracted; and
    wherein the linking provides links between object records having a same value of a respective type of the predetermined attributes, the linking further including generating an index.

3. An automated method of processing at least one document containing at least one object, comprising:
    providing extraction rules on a computer readable medium, the extraction rules being specific to respective object types and defining specific attributes to be extracted with the at least one object;
    the at least one object including a figure or table, the figure or table having identifiers of an independent variable and a dependent variable, the identifiers being specific attributes defined by the extraction rules to be extracted with the at least one object;
    the extraction rules defining the identifiers as attributes to be extracted;
    extracting data from each of the objects in each of the at least one document into an object record to generate extracted data, the extracting including interpreting and applying the extraction rules by means of a processor;
    linking each object record, including the extracted data, with its associated one of the at least one document including generating a document record, the linking including providing a link between object records where a same type of the specific attributes has a same value, the linking further including generating an index; and
    storing each linked object record in a computer readable medium.

4. The method of claim 3, further comprising:
    implementing a display process on a computer to:
        display data in the object record;
        navigate between the display of the at least one object record and the associated one of the at least one document; and
        navigate between object records having matching values of the identifiers.

5. The method of claim 3, wherein the extracting further includes incorporating in the object record extracted data representing the identifiers of the independent and dependent variables and the object.

6. An automated method of processing at least one document containing at least one object, comprising:
    extracting data from each of the at least one object into a corresponding object record;
    linking each object record and the extracted data contained therein, with its associated one of the at least one document;
    storing each linked object record in a computer readable medium;
    wherein the at least one object includes a figure;
    wherein the extracting includes identifying in accordance with rules specifying subject-specific predetermined user-defined object types, the at least one object from which data is to be extracted;

wherein the extracting includes extracting, from each identified object, values corresponding to predetermined attributes;

wherein the linking includes associating each object record with an abstract record, a full-text record, and a source record from which the object was extracted;

wherein the linking is effective to permit other object records, abstract records and/or full-text records to be found based on extracted attribute-specific values.

* * * * *